June 17, 1952  J. J. ACKELL ET AL  2,600,952
RECORDING AND ACCOUNTING APPARATUS
Filed Jan. 13, 1950  7 Sheets-Sheet 1

INVENTORS.
Joseph J. Ackell
BY Herbert L. Paulding
H. C. Thiesing

June 17, 1952  J. J. ACKELL ET AL  2,600,952
RECORDING AND ACCOUNTING APPARATUS
Filed Jan. 13, 1950  7 Sheets-Sheet 2

INVENTORS
Joseph J. Ackell and
BY Herbert L. Paulding
H. C. Chesney

INVENTORS.
Joseph J. Ackell
Herbert L. Paulding
H. C. Thiesen
BY

June 17, 1952    J. J. ACKELL ET AL    2,600,952
RECORDING AND ACCOUNTING APPARATUS
Filed Jan. 13, 1950    7 Sheets-Sheet 5
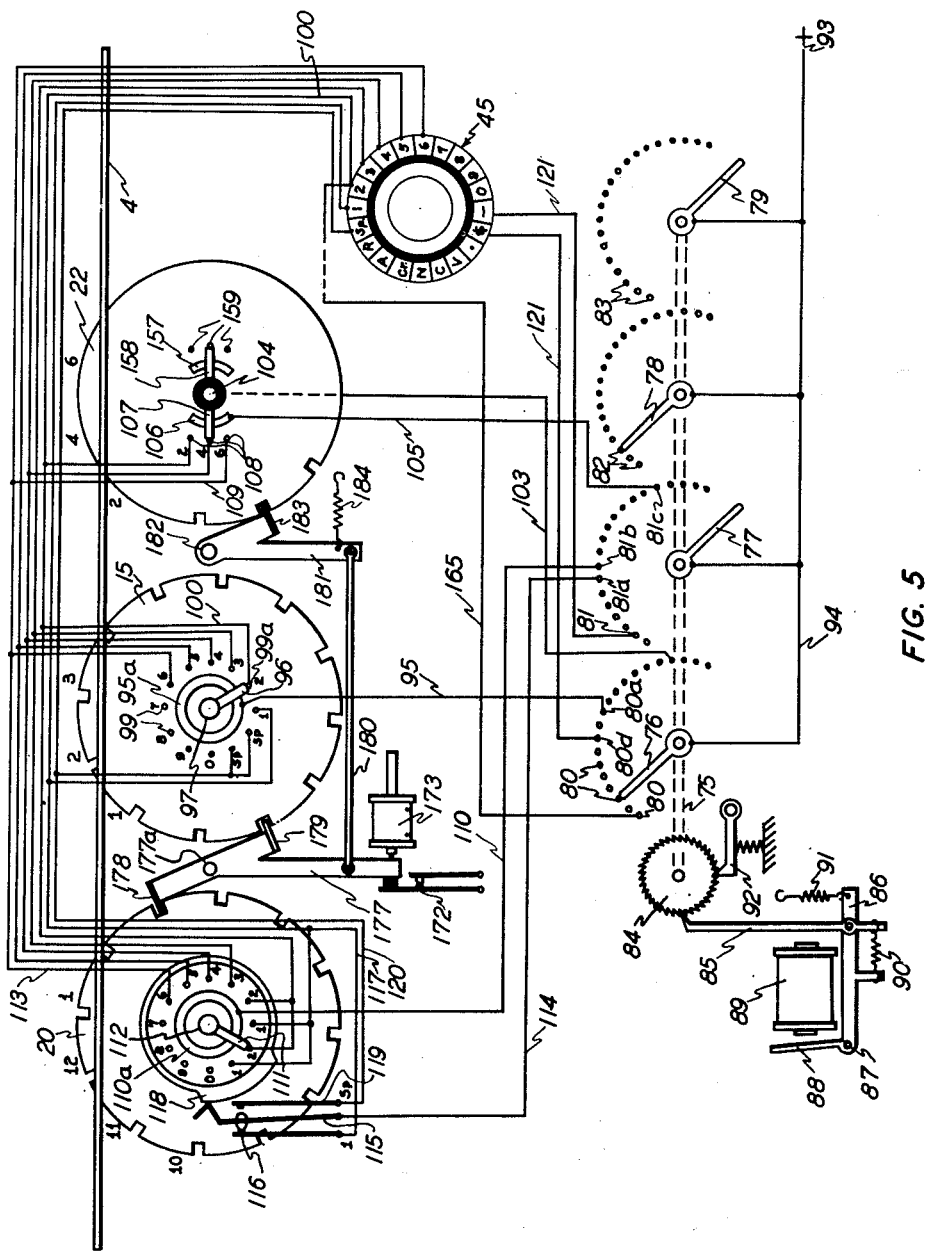
FIG. 5
INVENTORS.

June 17, 1952　　　J. J. ACKELL ET AL　　　2,600,952
RECORDING AND ACCOUNTING APPARATUS
Filed Jan. 13, 1950　　　　　　　　　　　　　7 Sheets—Sheet 7
FIG. 9
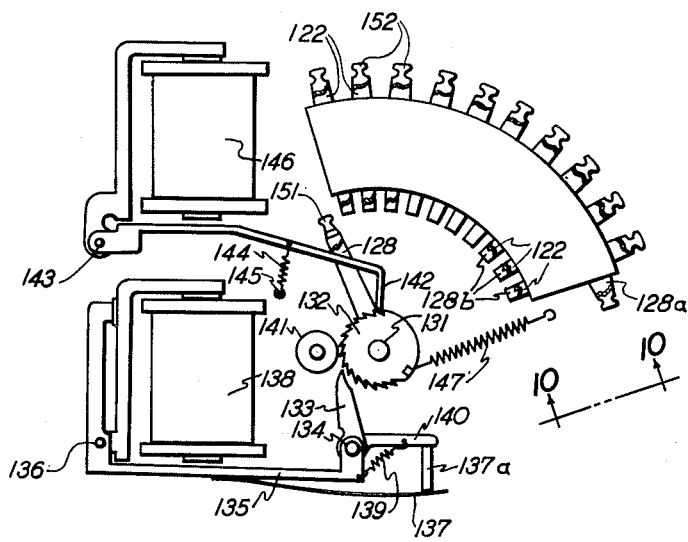
FIG. 11
FIG. 10
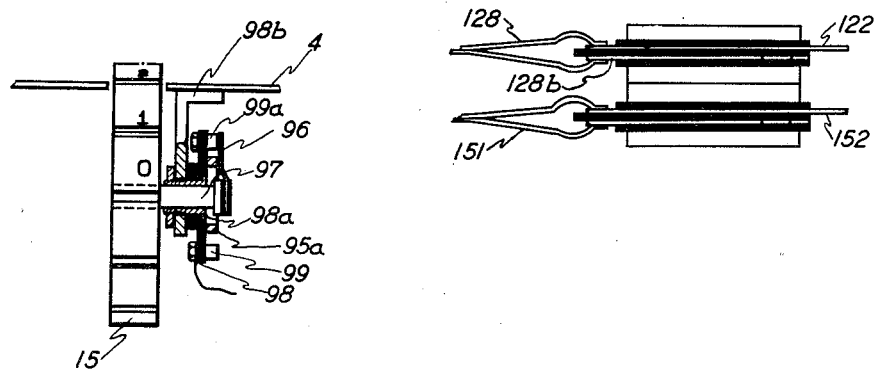
INVENTORS.
Joseph J. Ackell
BY Herbert L. Paulding
H. C. Thierry Patented June 17, 1952

2,600,952

UNITED STATES PATENT OFFICE 2,600,952

RECORDING AND ACCOUNTING APPARATUS

Joseph J. Ackell, Bellaire, and Herbert L. Paulding, Port Washington, N. Y., assignors to Dow Jones & Company, Inc., Wilmington, Del., a corporation of Delaware Application January 13, 1950, Serial No. 138,372

44 Claims. (Cl. 197—1)

This invention relates to electrically operated apparatus for recording desired entries or data on a plurality of record keeping cards or sheets and for otherwise facilitating accounting operations.

A primary purpose of the invention has been to provide apparatus of the foregoing type which is particularly suited for the efficient and accurate keeping of subscription records, such as those identified with a periodical publication or a continuous service. It is, however, adapted for a variety of uses among which may be mentioned, by way of example, the keeping of records relating to insurance policies, bank accounts, manufacturing operations, retail charge accounts, and the like.

An object of the invention has been to provide a simple and rapidly operable recording machine which is adapted to make a plurality of duplicate original entries, by a single printing means, on a number of different cards or sheets employed in an accounting system. Toward this end, provision has been made for repetition of the same entry on the desired number of record media and for locking certain adjustable controls against the setting-up of a new and different entry until the predetermined number of copies of the previous entry have been completed. Provision has also been made for varying at will, in the course of setting up an entry to be made, the number of copies to be required.

Another object has been to provide recording apparatus of the character indicated which is capable of high speed operation, with a minimum danger of error, and one which is simple to control and operate and is constructed for maximum convenience of the operator. A plurality of locks and interlocks is provided to guard against tampering and to insure the proper use of the machine. As an incident to the provision of means for controlling the production of a predetermined variable number of copies of a particular entry, an indication is provided of the completion of the selected number of copies.

A further object has been to provide a plurality of different controls, some adjustable manually, some variable automatically, and some of a predetermined and fixed character, for selecting the particular character to be printed by a single printing member as the latter is shifted axially, from column to column, in relation to a record card or sheet. The means provided for this purpose includes a main selector switch arranged to be operated automatically, step by step, to select successively the different controls to be effective in determining the character to be printed. This selector switch is coordinated with the step by step movements of the printing member in relation to the record card, so that each of the different controls is identified with a particular column or columns on the record card.

Still another object has been to provide automatic counting devices which serve to indicate the volume of business handled by the machine. These counting devices include a grand total counter providing an indication of the total number of entries recorded over a period of time, a subtotal counter adapted to provide a visual indication of the number of entries of a particular character made during a limited period of time and a counter adapted to control the recording devices, to include in the recorded data successive numbers indicating the sequence of entries during a day or other desired period of time.

Other objects, features, and advantages of the invention will appear from the detailed description of an illustrative form of the same which will now be given in conjunction with the accompanying drawings in which:

Fig. 5 is a detail view, partly in elevation and partly schematic, illustrating certain portions of the control devices and circuits and the main selector switch;

Fig. 9 is a detail view, in elevation with parts broken away, showing a step by step counting switch and the operating means therefor, four of these switches being embodied in the illustrative machine;

Fig. 10 is a detail view, taken along the line 10—10 of Fig. 9, showing the construction and arrangement of certain parts of the counting switch; and Fig. 11 is a detail view, in elevation, showing the mounting for one of the adjustable control dials.

Figure 1:
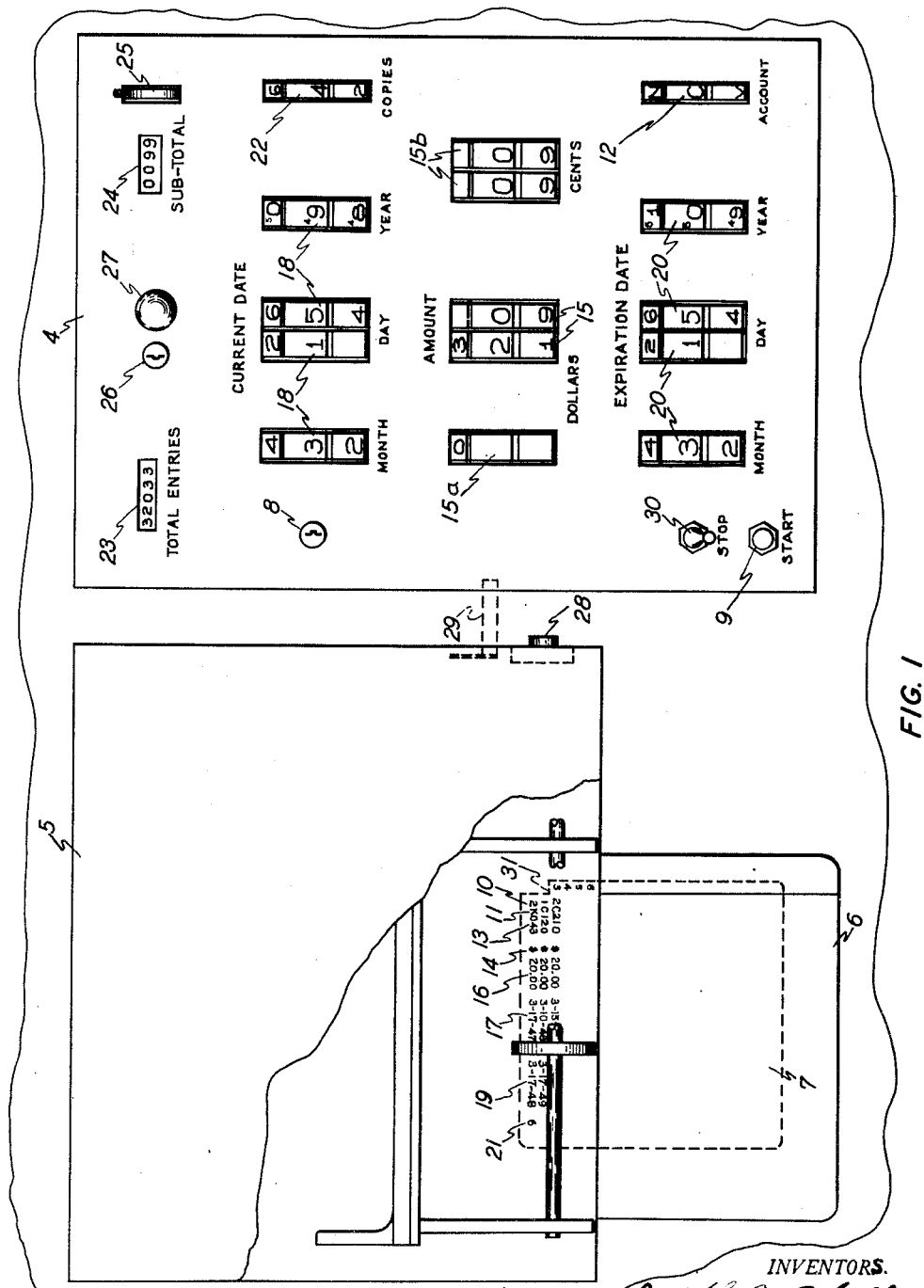
Fig. 1 is a top plan view of the principal portion of the apparatus, a cover member being broken away to illustrate normally concealed parts.

In the illustrated form of the invention it has been applied to the problems presented in the maintenance of subscription records by a periodical publication. It has been found desirable for this purpose to keep several sets of records, preferably in card form, one of which sets may be filed alphabetically, according to the names of the subscribers, and the other of which may be filed in accordance with the expiration dates of the subscriptions. One or more additional records of similar character may be kept, if desired. Also, it has been found desirable, as a close check upon the accuracy of the records, to record the subscription data on orders for new subscriptions or for renewals of old subscriptions and on the checks received in payment for such subscriptions. The latter entry enables the subscriber to verify the correctness of the entry of his subscription, upon the return to him of the cancelled check. Of course, when a subscription is renewed without the concurrent payment therefor, or when an order for renewal or a new subscription is given orally over the telephone, the entries will be made simply on the cards preserved in the files of the publishing company. The number of such records kept by the company may vary according to the character of the transaction, i. e. as to whether the order for the subscription is accompanied by the payment in full or whether other arrangements are made for payment. Therefore, it will be understood that the desired number of copies of a particular entry may vary with the circumstances.

The illustrative machine is adapted to provide a variable predetermined number of repetitions of the same entry under control of a "Number of Copies" selector. A single printing wheel is employed for the making of the several entries, this wheel being shiftable across the record card or other medium, from column to column, and being rotated under control of one after another of a plurality of different control means to select the character to be printed in each column. Movement of the printing wheel transversely across the record card is coordinated with the selection of the controlling means so that when the wheel is in a particular position along its supporting shaft, it will be controlled by a predetermined one of the plurality of different controls. In the apparatus disclosed, the wheel is moved successively to 40 different positions across the record medium and in doing so records indicia providing the following information:

1. A code number identifying the particular machine,
2. A letter or symbol indicating the character of the account,
3. A number, from 1 to 999, indicating the serial number of the transaction for the day or other selected period,
4. The amount of money involved in the transaction,
5. The current date,
6. The date of expiration of the new or renewed subscription, and
7. The number of copies being made of the particular entry.

Between the several items of data above indicated, blank spaces are provided and at appropriate points other characters, such as a dollar sign, a period, a dash, or the like, will be provided. Thus all of the pertinent information regarding a transaction is given.

Certain of the foregoing items are recorded automatically through either fixed or automatically variable controls within the machine and others are under the control of manually adjustable elements, these being in the form of rotatable dials in the illustrative machine.

It has been found desirable, in making use of the apparatus, to refer orders for new subscriptions firstly to the department responsible for the production of the necessary addressing plates. These are then used to print the subscriber's name and address upon the several record cards or media to be identified with the new account. The cards are then sent to the operator of the recording and accounting apparatus along with the existing cards of subscribers who have just ordered renewals of their subscriptions. The machine operator then sorts the cards, orders, and checks according to the amounts involved, depending upon the length of the subscription or renewal requested, and subsequently makes the desired entries upon all of the items. By sorting and grouping the items involving the same charge it is easy to compute the actual amount of money received, by multiplying the number of subscriptions of a particular character, entered upon the machine, by the cost of such a subscription. The value of the total subscriptions of each type may be separately computed and, so also, the cash transactions may be segregated from charge transactions and those of other types. An automatic counter is provided to indicate the number of transactions of a particular type entered and this counter may be reset by the operator upon the completion of the entry of the group of such subscriptions, after first jotting down the reading of this counter.

Figure 2:
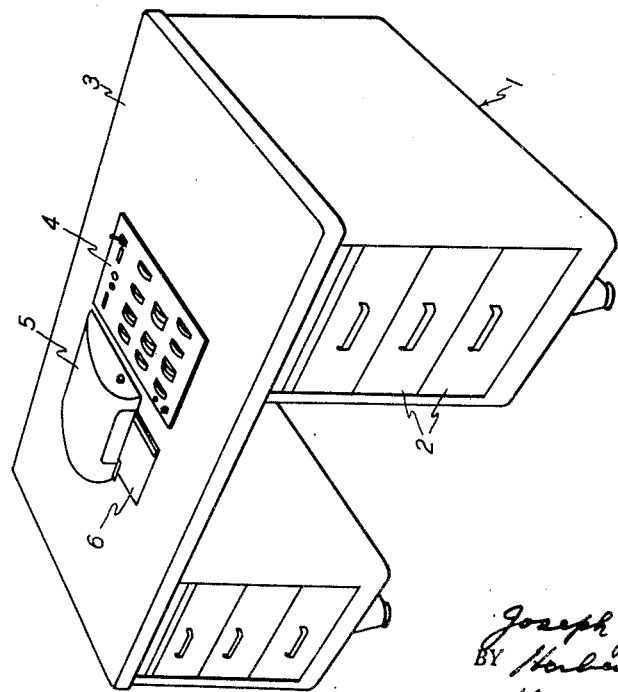
Fig. 2 is a perspective view of the complete apparatus.

Referring now to the drawings, there is shown, in Fig. 2, the preferred form of the complete apparatus. It has been found desirable to incorporate the recording and accounting equipment in a desk-like structure 1 which may suitably be constructed of steel. This provides space for drawers 2 for the storage of any articles required by the operator in the performance of her work. Supplies of various sorts may be kept in one drawer, for example, and one or more drawers may be devoted to the record media to be operated on during the day. It will be understood that a single machine is capable of handling records requiring considerably larger storage space than that provided in the desk structure and, therefore, other filing cabinets must be provided in the vicinity of the machine for the storage of the records. The top 3 of the desk provides space for the sorting of the material prior to making the entries, as explained above, and permits the work to be comfortably performed. A plate 4, located centrally of the desk top, is preferably pivotally or hingedly mounted on the top and normally conceals but provides access to the control mechanism for the recording devices. These control devices may, if desired, be supported directly from the plate. The plate is provided with suitable openings through which the various control dials or wheels, and the like, extend for manual adjustment or operation. The recording mechanism is provided beneath a slightly elevated hood 5 having a slot in its forward face through which the record media may be inserted to receive the printing impression. A plate 6, flush with the surface of the desk top, facilitates the insertion of the record media in proper position for receiving the entries. As will be explained more fully hereinafter, the plate 6 is provided with guides for insuring proper location of the record medium, such as a card 7 (Fig. 1), to be printed upon and with means for retaining the card during the entry of the item.

A lock 8 mounted in the plate 4 is adapted to be operated by a key in the possession of a supervisor or other party responsible for the records. It controls the application of power to the apparatus. When the machine is to be set in operation, the key is inserted and the lock turned. A switch connected with the lock, to be hereinafter described, causes a motor connected with the printer to be set in operation and closes certain of the control circuits. Preferably also, it provides some luminous signal to indicate that the machine is ready for operation. As will be explained hereinafter, the illustrative apparatus provides for the illumination of the control wheels or dials whenever these are in condition for readjustment for a new entry. The illumination is discontinued as soon as the first record of the new entry is being made and the dials remain darkened until the same entry has been repeated the desired number of times on the several record media.

While the machine is conditioned for operation by turning of the lock 8 the printing mechanism is not operated until a push button 9 is depressed. Assuming that the various controls have been set in a desired position for a particular entry, depression of the push button 9 will cause the first character to be printed in the column 10 on the record medium. This character may suitably be a symbol identified with the particular machine so that all records entered on that machine will carry the same symbol. At the completion of the printing of this character the printing wheel, to be described more fully hereinafter, is stepped to the next column 11 for the printing of a character indicating the nature of the transaction. For example, new subscriptions may be distinguished from renewals and a variety of other distinctions may be made between the various entries. The specific character to be printed in the column 11 is controlled by a dial or wheel 12 which extends through a slot in the plate 4 to permit manual adjustment by the operator. Upon completion of this recording operation, the printing wheel steps successively through the next 3 columns designated 13. In each of the three columns 13 the rotation of the printing wheel to select the character to be printed is under the control of the automatic numbering devices of the machine. This permits the recording of the serial numbers of the transactions from 1 to 999. After completion of the entry of the serial number the printing wheel moves through one or two columns in which blank spaces are to be left. This is accomplished by fixed circuits brought into play as the wheel reaches the column or columns in question and these fixed circuits select the blank position of the printing wheel. Next the wheel is moved to the column designated 14 wherein another fixed circuit predetermines the printing of a dollar sign. Upon shifting of the wheel to the next column the printing of a blank is predetermined by the machine, but this is subject to change under control of a dial 15a, in the event that the transaction being entered involves more than $99.00. In the next two columns the printing wheel is under control of a plurality of dials 15 adapted to be adjusted by the operator to indicate the dollar amount of the transaction. In the next column or position of the printing wheel it is controlled by a fixed circuit to cause printing of a decimal point, while in the next two columns it is controlled by dials 15b which are previously set in accordance with the cents involved in the transaction. Next the machine predetermines the leaving of one or more blank spaces. The last of these blank spaces is, however, subject to being changed to a 1 in case the date to be recorded in the next seven columns, designated 17 in Fig. 1, requires any of the numbers 10, 11 and 12 to indicate the months of October, November, and December. The numbers indicative of date, at this point, are selected under the control of dials 18 and are intended to represent the current date. The dashes appearing between certain of the numbers are predetermined by fixed controls which complete appropriate circuits as the printing wheel reaches these columns of the record and is rotated to present the dash character. Upon completion of the current date entry either one or more blank spaces are provided. Whether the last of these will be a blank or a 1 will depend again upon the particular month involved in the date designation under control of dials 20. These are adapted to be set by the operator in accordance with the expiration date of the new or renewed subscription to which the entry relates. A blank space, or two blank spaces if desired, will then be predetermined by the machine for the next column or columns of the record and finally in the column designated 21 the position of the printing wheel is determined by a dial 22 which selects the number of repeated copies to be made of the particular entry. As explained above, the nature of the transaction to be entered determines the number of copies to be recorded. The operator is, therefore, free to turn the dial 22 prior to the printing of the first copy of the entry but this dial and the dials 15, 20 and 12 become locked upon the commencement of the first copy of the entry and they remain locked until the completion of the selected number of copies. After the selected copy number has been printed in column 21, the type wheel is restored to the right (Fig. 1) in readiness for repetition of the same entry on a new record medium.

A register 23, visible through the plate 4, is provided to indicate the total number of entries made on the machine over any selected period of time. This may be a non-resettable register or the resetting of it may be under the control of the supervisor or other person in authority. Another register 24 is provided to indicate the number of entries of a particular group of transactions. This enables the operator to compute readily the dollar amount of the group of transactions by simply multiplying the number indicated on the register 24 by the amount, say $20.00, involved in each transaction. Upon completion of a particular group of entries the operator may reset the register 24 by rocking a lever or disc 25. As will be explained the registers 23 and 24 are operated only once for each transaction. Thus if four copies of an entry are made on four separate record media, only the first recording of the entry will be registered.

Certain controls are preferably made available only to a supervisor or other person in authority. For example, the adjustment of the current date dials 18 may be of this character. So, also, the supervisor may be the only one permitted to reset the counting devices which control the printing of the number designated 13 on the record medium. For this purpose a lock 26 is provided which may be turned by a key in the possession of the supervisor. In practice, it has been found desirable to have the supervisor turn the lock 26 at the commencement of each new day or other selected period of time. Turning of the lock releases the dials 18 for adjustment. It is assumed, of course, that the lock 8 has also been turned to set the machine in operation. Now upon depression of the push button 9 the machine will record the data controlled in part by its fixed circuits, in part by the dials 12, 15, 18, 20 and 22 and in part by the counter which controls the printing of the consecutive number designated 13. In the course of this printing operation, devices are automatically operable to reset the counter switches, which control the printing of the consecutive number, and to then advance the units switch of this counter to 1, so that the machine is conditioned for the printing of the number 1, in the appropriate column of the group designated 13, in connection with the first transaction for the day. When the machine has been thus conditioned for the day a light 27 will be illuminated and the supervisor may then turn the lock 26 back to its normal position and remove the key.

Access to the printing mechanism beneath the hood 5 is available only to a person having a key adapted to operate a lock 28. Upon opening of the hood 5, which may be hingedly supported on the top of the cabinet, a lock 29 may either be automatically operated or may be made accessible for manual operation to release the plate 4 for pivotal movement about its hinges. Lock 29 may simply be a pin which is spring urged into a recess in a part connected with plate 4. Any necessary inspection and repair of the mechanism may be made when the hood and the plate are thrown open in the manner indicated.

A switch 30, marked "Stop," is provided to enable the operator to stop the machine at any point in its operation, in the event that something goes wrong. For example, if the record medium becomes buckled and interferes with the movement of the printing wheel the machine may be stopped and the necessary adjustments made. On again closing the switch 30, which may be a simple snap switch, the entry of the particular transaction will continue.

As a simple means for predetermining the line along which an entry will be made on a record card, provision is made for removing a small section of the card along one edge, as indicated at 31, in the course of making each entry. Punching or shearing means, to be hereinafter described, is arranged to be operated upon each complete cycle of operation of the printing mechanism. Just enough of the card is removed at the edge to provide a new stop shoulder 31 to cooperate with a shoulder on the shearing means and position the next line on the card at the printing point.

Figure 4:
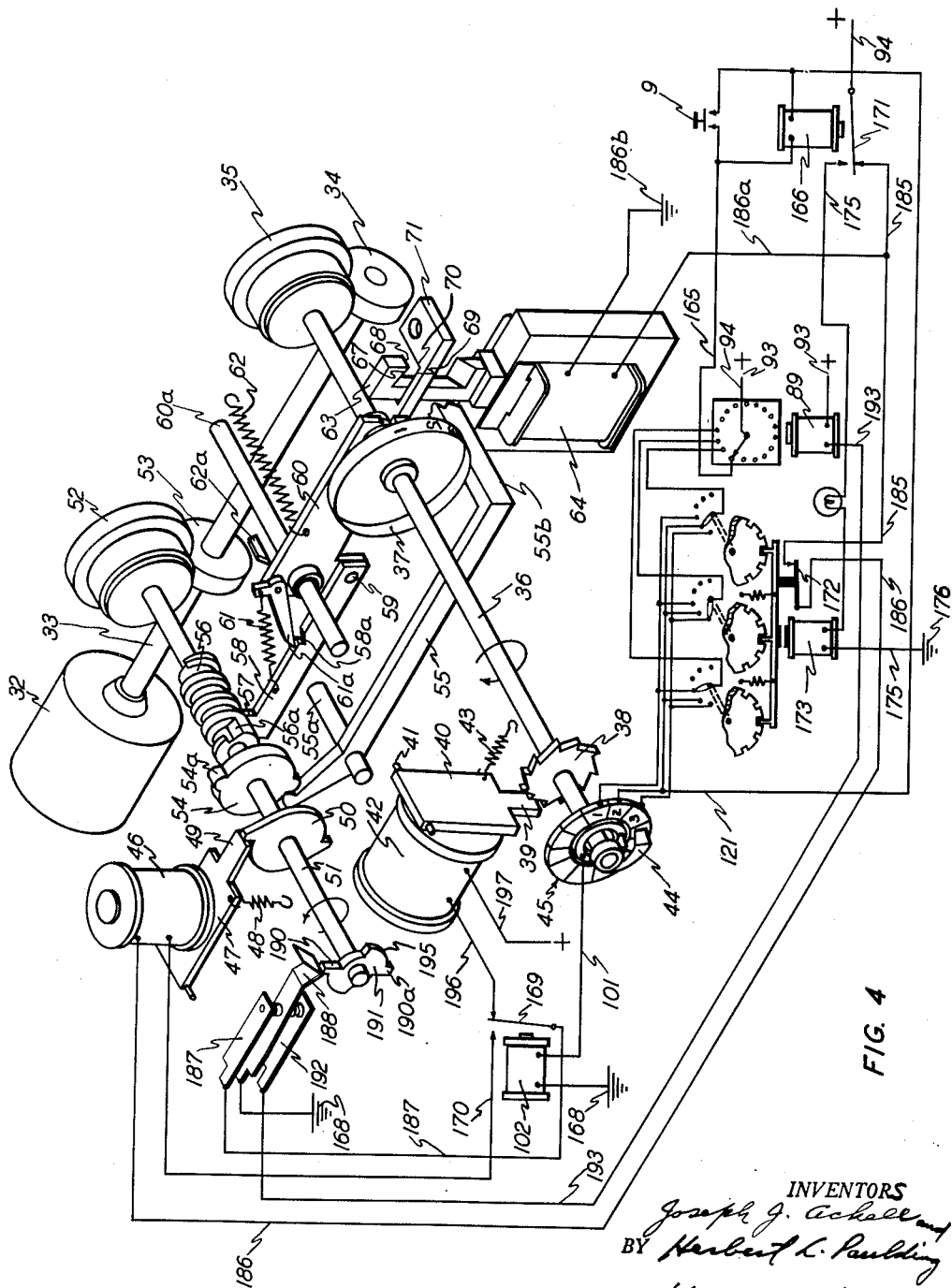
Fig. 4 is a schematic view, partly in perspective and partly in the form of a circuit diagram, illustrating the printing means and certain of the controls therefor and related devices.

Turning now to Fig. 4, there is schematically illustrated, in perspective, the principal parts of the printer. A motor 32 is provided, this being supplied with current upon the turning of the lock 8. A shaft 33 connected with the armature of the motor is constantly rotated, so long as the power is on, but none of the operative parts are driven until appropriate circuits are energized. At the outer end of the shaft 33 there is secured thereto a spiral gear 34 which meshes with a spiral gear 35 secured to the printing wheel supporting shaft 36. A friction slip clutch is provided between the gear 35 and the shaft 36, so that the latter will be driven only when released, slippage taking place between the parts of the clutch when the shaft is held against rotation. A printing wheel 37, having appropriate characters distributed about its face, is keyed to the shaft for rotation with it, but is mounted for sliding movement axially along the shaft. In the illustrative machine the wheel 37 is provided with 20 characters around its periphery and it is adapted to be stopped in any one of 20 positions to bring a selected character into printing position. A ratchet wheel 38, secured to the shaft, cooperates with a detent 39 carried by a plate or armature 40 pivotally mounted at 41 on a fixed part of the apparatus. When appropriate circuits are completed after the push button 9 is depressed, an electromagnet 42 is energized and serves to attract the plate 40 and thereby disengage the detent from the ratchet wheel. A spring 43 normally urges the plate and detent into active position. When the detent is withdrawn, the shaft 36 is driven through the clutch 35 and serves to rotate a brush element 44 at its outer end over the segments of a commutator 45. Rotation continues until another circuit is completed, as will be explained hereinafter, and the circuit through electromagnet 42 is broken to cause re-engagement of the detent 39 with the next succeeding tooth of the ratchet 38.

When the circuit through magnet 42 is broken to release the detent, a circuit will be completed through a magnet 46 which then attracts a plate 47 against the action of a spring 48 and withdraws a detent finger 49 from one of a pair of projections on a disc 50. This permits a shaft 51 to partake of a half revolution, this shaft being driven by a slip clutch connected with a helical gear 52 meshing with a helical gear 53 secured to the shaft 33. Toward the end of the half revolution of the shaft 51, a projection 54a on a disc 54 will engage the end of a lever 55 and rock this about its pivot 55a to carry a laterally bent portion 55b against the adjacent character on the printing wheel. Portion 55b thus constitutes an elongated platen capable of taking an impression from the printing wheel in any axial position which it may assume along the shaft 36. It will be understood that the record medium will be positioned between the platen and the type wheel and that the latter is supplied with ink in any suitable way, as by rubbing against an inked felt roller in the course of rotation.

Movement of the printing wheel along its shaft is produced by a worm 56 secured to the shaft 51. Cooperating with the worm is a finger 57 extending upwardly from a link 58 pivotally connected at 59 to a carriage 60. The latter is slidable along a supporting rod or shaft 60a. At its forward end the carriage 60 is forked and engaged with a groove in the hub of the printing wheel 37. A spring 61, connected at one end with the link 58 and at its other end with a latch 61a pivotally mounted on the carriage 60, serves to hold the finger 57 in engagement with the worm. The arrangement is such that for each half revolution of the shaft 51 the carriage will be advanced along its support and will, in turn, shift the printing wheel along its shaft 36 a distance equal to that between successive columns on the record medium. When an entry has been completed, upon the printing of the number in the last column 21 on the record medium, the finger 57 will be engaged by a cam portion 56*a* at the end of the worm and this will rock the link 58 downwardly about its pivot 59 until finger 57 is disengaged from the worm groove. The link is then held in this position by engagement of the end of the latch with a notch 58*a*. At this time the carriage 60 will be restored to its initial position by means of a spring 62. As the carriage reaches its starting positon the latch engages a fixed cam lug 62*a* which releases it and allows finger 57 to engage the worm. The device is then ready for a repetition of the same entry upon the depression of the push button 9 again.

Figure 6:
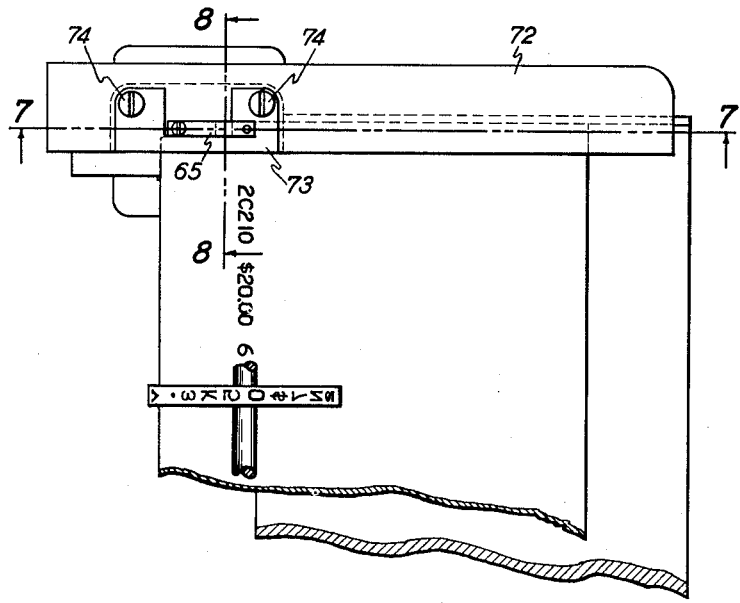
Fig. 6 is a detail view showing, in plan, a portion of a record card and its supporting, guiding, and punching means and the printing wheel.
Figure 7:
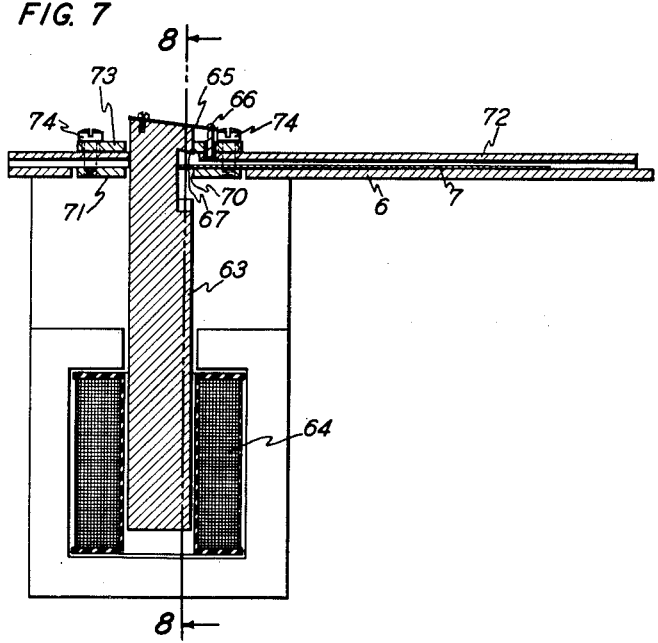
Fig. 7 is a vertical sectional view through the devices of Fig. 6 and is taken along the line 7—7 of Fig. 6.
Figure 8:
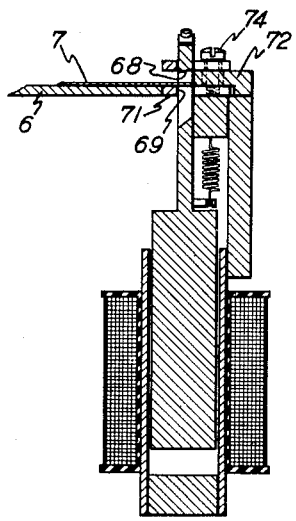
Fig. 8 is a detail view, in vertical section, taken along the line 8—8 of Fig. 6.

A punching or shearing member 63 is carried at the upper end of the armature of a solenoid 64 which is energized near the commencement of each printing cycle and remains energized until a full entry has been printed. A spring finger 65 (Figs. 6 and 7) mounted on the top of the shearing member carries a pin 66 adjacent its outer end and this is drawn downwardly into engagement with the record card or sheet 7 to retain it against accidental displacement during a printing cycle. Downward movement of the shearing member also carries inclined shearing edges 67 and 68 (Figs. 7 and 8) downwardly through the record medium and shears a small section from the edge of the latter by coaction with fixed edges 69 and 70, respectively, of a plate 71. Plate 71 fits into a cut-away portion of the plate 6 and may be in the form of a lateral extension from a member 72 having an upper flange spaced from and extending inwardly over a portion of the plate 6. A guide channel is thus provided for the card or other record medium which insures its uniform location in relation to the printing wheel. When the card is inserted, the last formed shoulder 31 thereon will be brought against the forward face of the shearing member 63 in a recessed region thereof just below the shearing edge 67 (Fig. 7). Shearing of a new section from the edge of the card during the printing of the new entry will insure insertion of the card a corresponding amount further into the hood 5 for the next entry so that this will be made on the next line of the card. As shown in Fig. 1 the margin of the card may carry a printed sequence of numbers which are successively removed by the shearing operations and thereby indicate the number of the next entry to be made. It has been found desirable, for the purposes of the illustrative machine, to employ a record card capable of receiving 10 or 11 successive entries. Provision is made on each card for a number of changes of address of the subscriber and also for indication of the party to be billed for the subscription. This is desirable in cases in which an individual is the subscriber, in the sense that he receives the periodical issues as they are published, but his company or firm is responsible for the carrying of the subscription. To reduce wear on the parts, a guide plate 73 may be mounted on the upper surface of the member 72 in the region of the shearing member, this plate being provided with an opening for the passage of the shearing member in its upward and downward movements. Plate 73 may be secured by screws 74 to the top of the guide member 72.

We come now to the means for controlling the various operative devices of the printing mechanism. Referring to Fig. 5, there is shown schematically a multi-contact switch which includes a rotatable shaft 75 mounted in suitable supports (not shown) and carrying a plurality of contact arms 76, 77, 78, and 79. Arm 76 is adapted to engage successively a series of twenty contacts 80 during a half revolution of the shaft 75. At the same time arm 77 is carried through an idle portion of its revolution. As the arm 76 passes from the last of the series of twenty contacts, arm 77 engages the first of its series of twenty other contacts 81. In a similar manner arm 78 engages successively a series of contacts 82 during one-half revolution of the shaft 75, while the arm 79 engages, successively, a series of contacts 83 during the other half revolution of the shaft 75. This shaft is rotated in a clockwise direction (Fig. 5) by means of a ratchet wheel 84 acted upon by a pawl 85 pivotally attached to a bell crank lever 86. The latter is pivoted at 87 to a fixed portion of the frame and carries an armature 88, as its other arm, adapted to be attracted by the electromagnet 89 when the latter is energized. This serves to rock the arm 86 downwardly, thus carrying the pawl 85 downwardly until its upper end is carried beneath the next tooth on the ratchet wheel. A spring 90 permits rocking of the pawl 85 as required in this movement. When the magnet 89 is de-energized, the arm 86 and pawl 85 are moved upwardly by a spring 91 to turn the shaft 75 through $\frac{1}{40}$ of a revolution. A spring urged detent 92 cooperates with ratchet wheel 84 to hold the latter against backward rotation during retraction of the pawl 85.

The switch above described may be designated the main selector switch, since it serves to select the particular control means to be effective during each printing operation of the platen 55*b*. Thus each of the contacts 80 and 81, except for the last few contacts of the group 81, is identified with one of the positions of the printing wheel along its shaft. The first contact 80 corresponds with the first column on the record sheet and, therefore, as will be explained hereinafter, when the arm 76 is on this contact a circuit will be completed to a definite section of the commutator 45 depending upon the character chosen to identify the particular machine. This character according to Fig. 3B is the number 2. The record card in Fig. 1 also shows that previous entries on the same card have been made on other machines.

Let us trace the circuit which will be completed when the arm 76 is carried to the contact 80*a* in Fig. 5. Current will be supplied from the positive side 93 of a current source through a line 94 to the inner end of arm 76 and through the latter to contact 80*a* which is, in turn, connected by line 95 to a collector ring 95*a* engaged by an arm 96 secured to a shaft 97 on which is fixedly mounted one of the series of dials or wheels 15 which may be manually adjusted by the operator to set up the amount of the transaction to be entered. The arm 96 extending radially from the shaft is arranged to engage any one of a series of contacts 99 (Figs. 5 and 11) carried by a fixed disc 98, formed of insulating material, secured to a bearing sleeve 98*a*. The latter is carried by a bracket 98*b* secured, by screws or the like, to the under surface of the plate 4.

It will be understood that each of the dials is similarly supported by a separate bracket. The particular dial illustrated is the tens of dollars dial which is set at 2 to represent a $20 transaction. The current passes from the collector ring 95a through arm 96 to the contact 99a with which it is engaged and which is connected by a line 100 (Figs. 5 and 3B) to a segment of the commutator 45 identified with the number 2. It may be explained here that each of the segments of the commutator is identified with one of the twenty different rotational positions of the printing wheel, most of which involve characters to be printed. Connections are provided from each segment of the commutator to each of the control devices which may, at one time or another, control the selection of that character. Thus the segment 2 of the commutator will be connected with each of the controlling means which is capable of selecting a number 2 when that controlling means becomes effective by the movement of the main selector switch, as above described. From this it will be apparent that the number 2 contact on the dial 15, shown in Fig. 5, will be connected with the number 2 contact on each of the other dials bearing the number 2. It will also be connected with the number 2 position of other controls capable of bringing about the printing of a number 2.

From the 2 segment of the commutator the circuit is completed through the brush arm 44, when this reaches the specified segment in the course of its rotation, then the line 101 (Figs. 3A and 3B) and the coil of magnet 102 back to the grounded side of the circuit. What happens upon completion of the circuit in this way will not be explained at this time, since this will require discussion of other parts of the circuit system which have not yet been described.

It will be understood that other shafts like 97 carry other arms, similar to 96, adjacent and arranged to turn with the other dials of the series 15a, 15 and 15b to cooperate with contacts, similar to 99, carried by fixed discs, similar to disc 98, which are in turn connected by lines, similar to line 100, with the appropriate segments of the commutator 45. It should be understood that lines similar to 95 will serve to connect individual contacts 80 in the region of contact 80a with corresponding arms 96, through collector rings similar to 95a, so that a particular one of these arms will be active when the main selector arm 76 reaches a particular contact 80. The several arms 96 mounted on the separate shafts 97 are, of course, insulated from each other.

Returning to Fig. 5, a number of the contacts 80 are connected by a series of lines 103 (only one being shown) with arms, similar to arm 96, forming parts of dial units of the type explained which are coaxial with a shaft 104. These units carry the dials 18 identified with the current date. Their arms, similar to 96, will, therefore, become successively effective to control the stopping of the brush arm 44 and shaft 36 as the arm 76 is stepped around to the corresponding contacts 80. It should be understood that the arms, similar to the arm 96, which are carried by shafts similar to the shaft 97 are positioned adjacent the dials 18 and cooperate with one or another of series of contacts, similar to 99 (Fig. 11), on the faces of discs fixedly mounted adjacent dials 18, depending upon the positions to which they are adjusted. These contacts are connected, in turn, by a series of lines, similar to the line 100, to the appropriate sections of the commutator 45 (Figs. 3B and 5).

A contact 81c is connected by a line 105 with a collector segment 106 cooperating with an arm or bar 107 carried by dial 22 secured to the shaft 104. The arm or bar 107 serves to bridge the collector segment 106 with one or another of a plurality of contacts 108, depending upon the position of adjustment of the dial 22. Segment 106 and contacts 108 are carried by a fixed disc similar to 98. Each of the contacts 108 is connected by a line 109 with the appropriate segment of the commutator 45 (Figs. 3B and 5).

In a similar manner, contact 81b is connected by a line 110 with a collector ring 110a cooperating with an arm 111 carried by a shaft 112 which supports one of the series of dials 20, adapted to be set to indicate the month involved in the expiration date. Other dials of the group 20, identified with the expiration date, and the dial 12, adjustable to indicate the character of the account, are similarly connected with appropriate contacts of the groups 80 and 81. The arm 111 and other similar arms serve to bridge the collector rings with one or another of series of fixed contacts carried by discs, similar to 98, adjacent the several dials. Each of the contacts of these series is connected by a line 113 with an appropriate one of the segments of the commutator 45. It will be understood that the contacts related to corresponding numbers on the several dials may be interconnected and, in turn, connected by a single line 113 with the related segment of the commutator.

Contact 81a which is reached just in advance of contact 81b in the rotation of the arm 77 is connected by a line 114 with a switch arm 115. The latter, as shown in Fig. 5, is engaged with a contact 116 to complete a circuit through a line 117, which is connected with the 1 segment of the commutator 45. When the dial 20 is rotated to carry a cam projection 118 away from the upper end of the switch arm 115, the latter will be spring urged toward the right and will engage a contact arm 119 to complete a circuit through line 120 with that segment of the commutator 45, designated Sp in Fig. 5, which is identified with a blank space on the printing wheel. This arrangement is such that when the dial 20 is adjusted to any of the month designations 1 to 9 a blank will occur on the record just in advance of the month designation for the expiration date. However, when the dial 20 is adjusted to either the 10, 11 or 12 position, the number 1 segment of the commutator will be rendered active to cause the printing of a 1 in the column just in advance of those designated 19 on Fig. 1. It will be understood that either a 0, 1, or 2 will then be printed in the next column, depending upon the particular setting of the dial 20. As shown in Fig. 5, the dial 20 is set to cause printing of the month designation 12 in the two columns of the record controlled by this dial. A similar arrangement is provided for that dial of the group 13 which designates the month of the current date.

It should be observed at this point that, for simplicity of manufacture, all of the adjustable dials are of the same construction and are provided with twelve character spaces. When only a portion of these are required for the purposes of the dial, as in the case of the dial 15 shown in Fig. 5, the contacts 99 related to the extra sections of the dial are connected with the space segment of the commutator. Ordinarily these contacts will not come into play since the dials should be set to designate some desired character.

However, if the dial should inadvertently be left in a blank position the apparatus will be permitted to continue through a complete recording cycle, as will be explained, and a blank space will simply be left on the record in the particular column involved.

Some of the contacts on the main selector switch are connected directly with corresponding segments of the commutator 45 through a plurality of lines 121 (Figs. 3B and 5). For example, the contacts corresponding with the columns of the record entry which are always to be left blank are so connected with the segment of the commutator identified with the blank position of the printing wheel. So also, the contact 80d which controls the printing of the dollar sign in column 14 of the recorded entry is directly connected with that segment of the commutator identified with the dollar sign on the printing wheel. Likewise, the contacts 81 which correspond with the columns of the recorded entry in which dashes are always printed are directly connected with that segment of the commutator which is identified with the dash on the printing wheel. The first contact 80, which is engaged when the machine is at rest in its initial position, is connected directly with the commutator segment identified with the character designating the machine, i. e., the number 2 segment in the machine illustrated.

To control the printing of the consecutive numbers in the columns identified 13 on the record entry a series of three counting switches of special construction is provided. One of these switches is illustrated in some detail in Fig. 9 and all three are illustrated schematically in Fig. 3B. The switch identified with the units order of the number has a series of 10 contacts 122 representing numbers from 0 to 9. These contacts are connected by lines 123 with similar contacts 124 identified with the same numbers on the tens order switch. The latter, in turn, are connected by lines 125 with corresponding contacts 126 identified with the same numbers on the hundreds order switch. Contacts 126 are, in turn, connected by lines 127 with contacts within the control panel 4 corresponding with the numbers 0 to 9. These contacts are, as previously explained, connected by lines 100 with corresponding segments of the commutator 45.

The switch identified with the units order of the counter is provided with an arm 128 adapted to be shifted successively from one contact 122 to another. Similarly the tens order switch has an arm 129 adapted to engage successively the contacts 124, while the hundreds order switch has an arm 130 adapted to engage successively the contacts 126.

Referring now to Figs. 9 and 10, the switch identified with the units order of the counter will be described and it should be understood that the other two switches may be of the same construction. Actually the arm 128, which is secured to a shaft 131 and rotated therewith, does not serve as a conductor from its axis to the engaged contact 122, as schematically indicated in Fig. 3B, but rather serves to bridge and provide a connection between a collector member and the selected contact 122. Thus a common connection 128a is provided from a suitable point in the circuit, to be explained, to the collector member which has a series of projections 128b aligned with the inner ends of the contacts 122. As the arm 128 is rocked downwardly in Fig. 9 it interconnects, successively, the extensions 128b with the contacts 122.

Rotation of the shaft 131, step-by-step, is accomplished by a ratchet 132 secured to the shaft arranged to be engaged by a pawl 133 pivotally mounted at 134 on an armature 135, pivoted at 136. A leaf spring 137 connected with the horizontal arm of the armature normally urges the latter clockwise, the spring being biased in this direction from its point of engagement with a fixed abutment 137a. However, when an electromagnet 138 is energized the armature is attracted against the action of the spring and the pawl 133 then engages the adjacent tooth of the ratchet 132 and moves the same one step. A spring 139 coacting between the armature 135 and arm 140 of the pawl 133 normally urges the latter clockwise into engagement with the ratchet. However, when the armature is in the position shown, the arm 140 of the pawl engages the fixed stop 137a and rocks the pawl slightly to disengage its point from the ratchet. It will be understood that spring 137 is stronger than spring 139. When the armature is attracted by the magnet, however, the pawl is rocked by spring 139 into engagement with the ratchet. As the pawl advances it turns the ratchet one step and then engages a stud or roller 141 which wedges it to prevent overthrow. A detent 142 cooperates with the teeth of the ratchet to hold the latter in the position to which it has been shifted by the pawl 133. Detent 142 is pivotally mounted on a fixed pin 143 and is urged into engagement with the ratchet by a spring 144 connected with a fixed stud 145. After the arm 128 has reached the lowermost contact 122, which is identified with the number 9, a circuit is completed, in the manner to be explained, through a magnet 146 which attracts the detent 142, which forms the armature of the magnet, to release the ratchet 132. A spring 147 connected with the ratchet then rotates the latter back to the position shown in Fig. 9 which is one step beyond 0 position.

As a part of the means for causing the resetting of the arm 128, in the manner explained, and also causing a one-step movement to be imparted to the tens counter or switch after the arm 128 has reached the 9 contact 122, a second arm 151, similar to the arm 128, is secured to the shaft 131. This second arm serves to bridge extensions, corresponding to extensions 128b, from a second collector member over to a series of contacts 152, similar to contacts 122 and parallel with the latter in Fig. 9. In a similar manner the switch identified with the tens order of the counter is provided with a second arm 153 (Fig. 3B) adapted to engage successively a series of contacts 154 to complete a circuit through one of these. Likewise the hundreds order switch is provided with a second arm 155 arranged to engage successively a series of contacts 156 to complete a circuit through one or another of these at the appropriate time.

Since the circuits through the counter switches described above also pass through a similar counter associated with the dial which determines the number of copies to be printed, the latter will now be described. The dial 22 which determines the number of copies of an entry to be printed has a second collector segment 157 (Figs. 3B and 5), similar to the sector 106. An arm 158 carried by the dial serves to connect the sector 157 with one or another of a series of contacts 159. The latter, in turn, are connected with contacts 160 of a switch member identical with that shown in Fig. 9. A arm 161, corresponding with arm 151 of Fig. 9, is arranged to engage successively the contacts 163 to complete a circuit through the selected one of the latter after the arm 161 has been stepped the appropriate number of times. The counting switch identified with the number of copies also has an arm 162 adapted to cooperate successively with a series of contacts 163 in the same manner as arm 128 engages contacts 122. However, only the first two of these contacts enter into any of the circuits involved in the illustrative machine and, therefore, the remaining contacts may be omitted, if desired.

The operation of the apparatus will be best understood from a description of certain typical operations. Let us assume that the apparatus is in the position which it takes following the completion of the predetermined number of entries of a particular item. At this time the various adjustable dials will be freed for readjustment to a new setting. The printing wheel carriage will be restored to its right-hand position and the wheel will be rotated to the position in which it is ready to print a designation corresponding with the particular machine. In the drawings it has been assumed that this designation will be the number 2. The copy switch arms 161 and 162 will have been restored or reset to a point one step below the 1 position and will have been advanced one step to the 1 position prior to the completion of the preceding printing operation, which was the last of the selected number of copies to be made. The main selector switch, represented by the arms 76, 77, 78 and 79 of Fig. 5, will have returned to the starting position which is that represented diagrammatically in Fig. 3B. This is by virtue of the fact that the arms will have been rotated through the 40 steps involved in making a single entry of an item. It will be understood that the printing impression controlling shaft 51 will be in the position of rest indicated in Figs. 3A and 4.

With the parts in this condition and with the switch 8 (Fig. 3A) closed by the turning of the lock in the manner previously explained, a circuit will be completed from the positive side 93 of the current source through line 94 (Figs. 3A and 3B) to a branch line 164 extending to the axis of the arms 76, 77. These arms are shown as a single arm in Fig. 3B. Its outer end is on the first contact of the main control switch which is, in turn, connected through a line 165 with the coil of a relay 166, the opposite side of which is connected by line 167 with the number 2 segment of the commutator 45. Since the armature 44 will have been stopped on this segment at the conclusion of the preceding cycle, as explained above, the circuit will be completed through this armature and the line 101 to and through the coil of magnet 102 and thence to ground at 168. Accordingly, it will be seen that switch arm 169 will be drawn upwardly into engagement with the contact at the lower end of a line 170, but no circuit will be completed through this line at this time due to the fact that switch arm 171 is held open by the magnet 166 which is energized in the manner explained. The same circuit is also broken at switch arm 172 which is at this time attracted by a magnet 173, the coil of which is in an active circuit. That circuit extends from the positive side of the power source through line 94, branch line 174, switch arm 171, and line 175 to and through the coil of magnet 173 and a lamp 173a, which illuminates the dials, then over to the first contact 163 (Fig. 3B) of the copies counter and through arm 162 of the latter down to ground at 176.

Magnet 173, which is energized at this time, in addition to operating the switch 172 serves to operate a locking member 177 (Fig. 5) which is pivotally supported at 177a and which carries locking bars 178 and 179 adapted to engage slots formed in the peripheries of the various adjustable dials of the groups 20, 12 and 15. A link 180 connecting an arm of the member 177 with an arm of another locking member 181, pivoted at 182 on the frame, simultaneously controls the action of a locking bar 183 which cooperates with the copies control dial 22. A spring 184 acting upon member 181 normally serves to urge the several bars 178, 179 and 183 into locking engagement with the notches in the several control dials. However, when coil 173 is energized in the manner explained, the armature of the solenoid is shifted toward the left in Fig. 5 to unlock the various dials and simultaneously open the switch 172. Locking bar 183 may, if desired, cooperate with the dials 18 which control the setting of the current date, but it is preferred to provide a separate locking means for these dials under control of the switch 26 so that the supervisor, who places the machine in condition for operation at the commencement of a day, may set these dials and they will then remain set for the balance of the day.

Figure 3A:
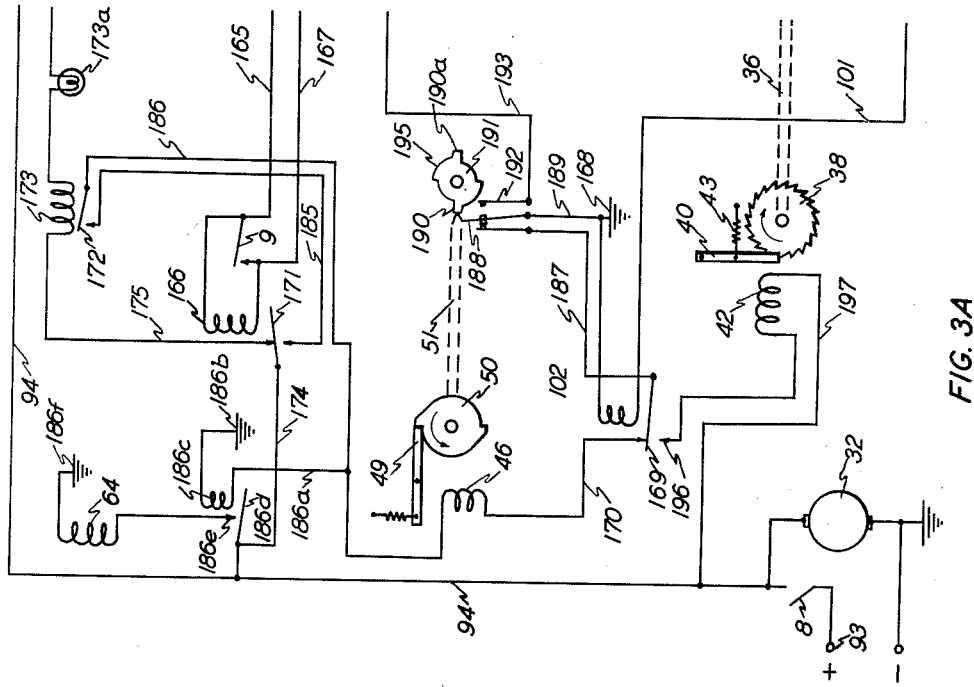
Figs. 3A and 3B are complementary to each other and, when combined end to end, constitute a schematic illustration of the electrical circuits and associated devices embodied in the apparatus.
Figure 3B:
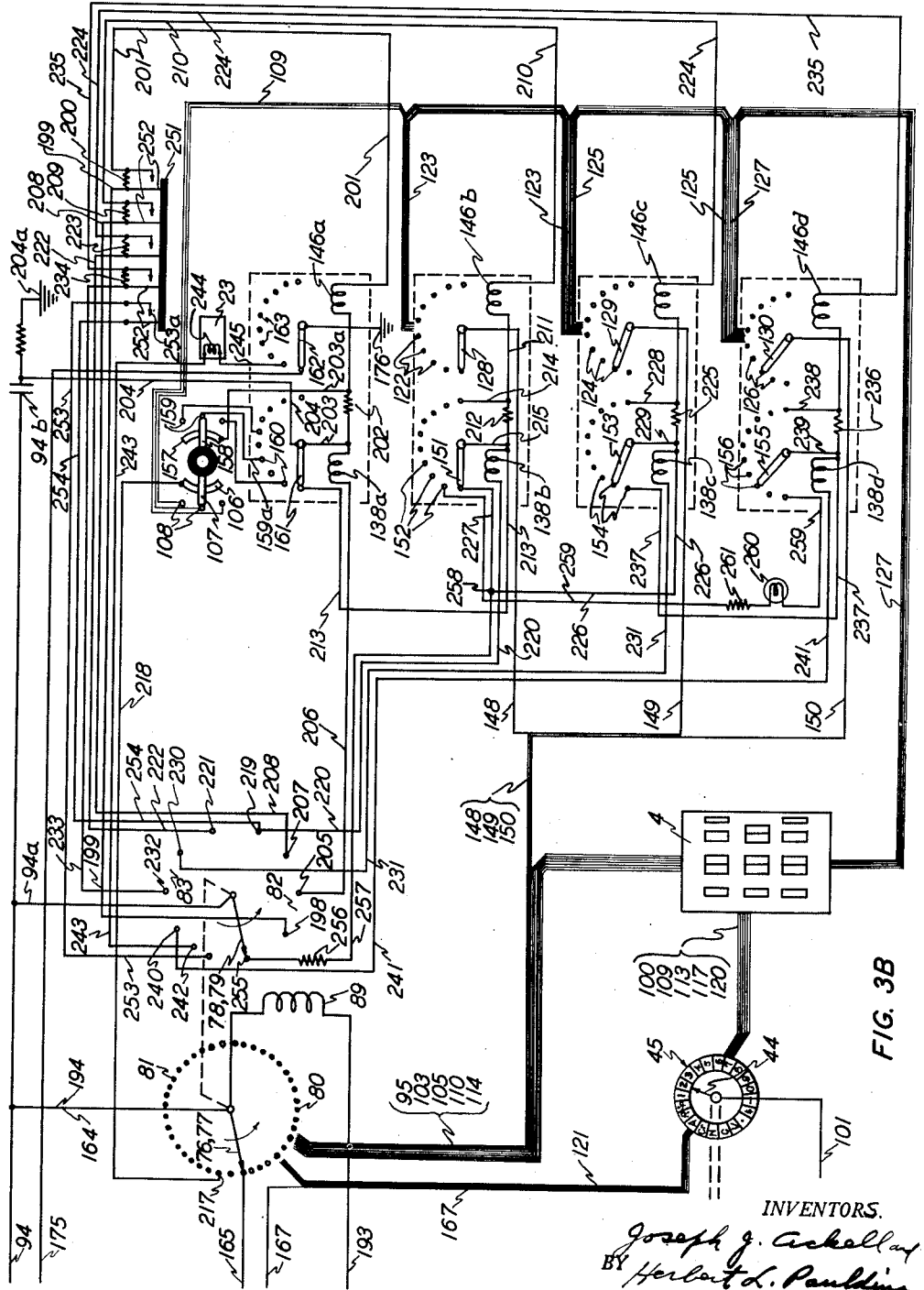

Returning now to the circuits of Figs. 3A and 3B, and assuming that the various dials have been set to the desired positions for the next entry and a card has been inserted to receive it, the operator will depress the starting button 9 (Fig. 1) which is illustrated as a switch in Fig. 3A. Closing of this switch will short circuit the coil 166 and will cause the switch arm 171 to be shifted, by a suitable spring, to break the circuit through line 175 and make a new circuit through a line 185. Breaking of the circuit through line 175 will deenergize the solenoid 173 and thus permit spring 184 to lock the various adjustable dials and, at the same time, the illumination of the dials by the lamp 173a will be interrupted. Line 185 will, at this time, be connected through the switch 172 with a line 186, magnet 46, line 170, switch arm 169, a line 187, another switch arm 188 and a line 189 with the ground at 168. This circuit, it will be understood, is completed from the positive side of the current source through lines 94, 174, and switch arm 171. At the same time a circuit will be completed to ground at 186b through a branch line 186a leading from line 186. This circuit includes a relay coil 186c which shifts a switch arm 186d into engagement with a contact 186e thus completing another circuit from line 94 through the coil 64 of the punching mechanism to ground at 186f. The latter circuit is held closed throughout the recording of the entry on the card so that spring finger 65 (Fig. 7) will hold the card in position as previously explained. In Fig. 4 this circuit has been simplified by omitting the relay coil 186c and placing the solenoid 64 in its stead. Use of the relay simply insures an adequate supply of current to the coil 64.

Energizing of the magnet 46, in the way explained, operates the stop arm 49 to release member 50 and the printing shaft 51 for a half revolution. In the course of this half revolution of the shaft, the projection 54a on member 54 will cause operation of the platen arm 55 to take an impression from the printing wheel which, as explained, is at this time positioned to print the number 2. Also, in the course of rotation of the shaft 51 the printing wheel carriage will be shifted one step toward the left (Fig. 4).

Upon the commencement of the rotation of the shaft 51, switch arm 188 (Fig. 3A) will ride off of a projection 190 on a cam member 191 secured to the shaft. This will cause opening of the circuit between the lines 187 and 189 and will simultaneously close a circuit between line 189 and a switch arm 192. The latter is connected by a line 193 with the coil of magnet 89, the opposite side of which is connected by line 194 with the line 94 extending from the positive side of the power source. Energizing of the magnet 89 in this manner will serve to retract the pawl 85 (Fig. 5) and condition the latter for turning of the ratchet wheel 84 through one step when magnet 89 is deenergized. Such deenergization of the magnet is brought about by a partially elevated portion 195 of the cam 191 (Fig. 3A) which engages the switch arm 188 at about the mid-point in the half revolution of shaft 51. Projection 195 of the cam is of such height that it will hold the switch arm 188 in an intermediate position in which the circuit is opened to both of the lines 187 and 193. During this interval, the pawl 85 (Fig. 5) will be released by magnet 89 and operated under the influence of spring 91 to turn the ratchet 84 and hence the various arms of the selector switch through one step. After this has been accomplished, a projection 190a of the cam 191 (Fig. 3A) will engage the switch arm 188 to close the circuit between the latter and line 187. In the meantime, however, the circuit through magnet 102 will have been broken by the shifting of the switch arm 76 from the first contact of the selector switch to the second contact. This breaks the circuit formerly completed between lines 164 and 165. As the magnet 102 is thus deenergized switch arm 169 is shifted by a suitable spring into engagement with a contact 196. A circuit will now be completed from the positive side 93 of the current source through line 94, branch line 197, magnet coil 42, contact 196, switch arm 169, line 187, switch arm 188 and line 189 to ground at 168. Magnet 42 will at this time operate the arm 40 to release the ratchet wheel 38 and permit rotation of the printing wheel supporting shaft 36 until the commutator brush arm 44 (Figs. 3B and 4) reaches the proper segment of the commutator 45. When this is reached, magnet 102 is again energized to operate switch arm 169, thus breaking the circuit through the magnet 42 and simultaneously completing the circuit through the magnet 46 to effect printing of the new character. In the arrangement illustrated, this occurs when the brush arm 44 of the commutator reaches the segment identified with the character selected by the adjustable dial 12 designating the character of the account or entry being made. The circuit through magnet 102 is completed at this time as follows: from the positive side of the current source at 93, through line 94, line 164, arm 76 to the second contact of the selector switch, thence through a line similar to 110 to the control panel 4 at which the line is connected with the axis of an arm, similar to 111 (Fig. 5), identified with the dial 12. Assuming that the letter C is to be printed, as indicated by Fig. 1, the arm 111 will engage the C contact on the face of the dial wheel and this will, in turn, be connected through a line similar to 113 with the C segment of commutator 45. When the arm 44 reaches the C segment, in the course of rotation of the released shaft 36, the circuit will be completed through line 101 and magnet 102 to ground at 168.

At this time the printing cycle described above incident to the half revolution of shaft 51 will be repeated and the various circuits will be opened and closed in the manner and sequence described. Printing of the letter C on the record sheet will take place and the carriage will step to the third position and the main selecting switch will be stepped to its third position. The contact 80 engaged by arm 76 at this time will, through the line 150, place the rotational position of the printing wheel for the next operation under control of the hundreds switch of the counter mechanism.

Assuming that the arm 130 of the hundreds order switch of the counting unit is in the number 2 position (Fig. 3B) the engaged contact 126 will, as explained, be the one that is connected through one of the lines 127 with the number 2 segment of the commutator 45. Rotation of the shaft 36 will, therefore, be permitted until this segment is engaged by the brush arm 44 at which time the circuit through magnet 42 will be broken, to arrest the ratchet 38, and the circuit through magnet 46 will be made to repeat the printing cycle incident to a half revolution of the shaft 51.

For the next or fourth position of the printing wheel the main selector switch, by engagement of its arm 76 with the fourth contact 80, connected with line 149, will predetermine control of the rotation of the printing wheel by the tens denomination switch of the counting unit. Arm 129 of this switch being on the number one contact 124 will cause the commutator brush arm 44 to stop on the 1 segment of the commutator by completing a circuit through magnet 102 at this time. Then upon the next half revolution of the shaft 51 the printing of the number 1 will take place and the other functions incident to rotation of shaft 51 will take place, leaving the carriage in the fifth position and the arm 76 of the main selecting switch on the fifth contact 80. This is connected with the units order of the counting system through the line 148 and will place the printing wheel under the control of this order of the counter. Arm 128 being at this time on the 0 position will predetermine stopping of the brush arm 44 on the 0 segment of the commutator and will bring about a repetition of the printing cycle to record the 0.

On the resulting operation of the main selecting switch, the arm 76 will be brought to the sixth contact 80 which is connected directly by one of the lines 121 with a segment of the commutator corresponding with a blank position on the printing wheel. This may suitably be the commutator segment identified also with carriage return at the appropriate time since it is desirable to have a blank portion of the printing wheel opposite the record card, at this time, to avoid smudging. It will be understood that the rotation of shaft 36 and brush arm 44 will be arrested when this blank segment of the commutator is reached and the printing cycle will again take place but no character will be printed because of the absence of any character on the type wheel at this particular point. All of the circuits, however, identified with the rotation of the shaft 51 will be made and broken in the sequence hereinbefore explained.

Another control circuit, however, is energized under certain circumstances when the main selecting switch reaches the sixth position mentioned above. This is due to the engagement of the switch arm 78 with a contact 198 of the group 62. Contact 198 is connected by a line 199 with a resistance 200 at the upper right-hand corner of Fig. 3B and through the latter is connected by a line 201 with the coil of magnet 146a, corresponding with coil 146 of Fig. 9, identified with the counting switch associated with the number of copies control. From the coil 146a the circuit extends through a resistance 202 and a line 203 to a line 204 connected with the grounded side of the circuit at 204a. A circuit is thus completed from the line 94 but due to the combined resistance of the members 200 and 202 nothing will occur. Insufficient current will flow through the coil 146a to operate the resetting devices of the switch illustrated in Fig. 9. However, if either of the resistances 200 and 202 is short circuited, in the ways to be explained, sufficient current will flow through the coil 146a to operate the resetting means. Resistance 202 will be short-circuited whenever the arm 161 has been shifted to the contact 160 corresponding with the number of copies to be made, as determined by the dial 22. The circuit at this time will be completed from the coil 146a through a line 203a to the collector segment 157, thence through the arm 158 of the copy selector to the selected contact 159, and thence by line 159a to contact 160. When arm 161 has reached the selected contact the circuit will be completed through this arm to the line 204 which then completes the circuit in the manner explained. In the setup illustrated in Fig. 3B this will occur when four copies have been selected and the fourth entry is being made. It should be noted in this connection that it is difficult to provide adequate power directly from the line to operate the resetting magnet 146a in the manner explained and, therefore, a condenser 94b is interposed in the line between the branch-off 94a and the point at which line 204 connects to ground. It will be understood that the condenser is in effect a battery which serves to build up and store a certain amount of energy that is released upon the completion of the circuit in the manner explained. The current thus provided is sufficient to operate the resetting magnet. As explained, however, this resetting operation will not occur during the entry being described which is the first entry of the particular item.

Having completed the operation at the sixth position of the printing wheel and having stepped the arm 78 of the main selector switch to the seventh position, together with the shifting of the carriage to its seventh position, the machine is arranged to cause another space or blank printing operation. In the eighth position of the main selector switch and the printing wheel, the parts are conditioned for the printing of a dollar sign. This is by virtue of the connection of the eighth contact 98d directly with the dollar sign segment of the commutator 45 so that when the brush arm 44 reaches that segment the circuit will be completed through line 101 and magnet 102 to bring about the same printing cycle as has been previously described.

In the ninth position of the main selecting switch and the printing wheel, the latter is placed under control of the dial wheel 15a which determines the hundreds of dollars involved in the transaction to be entered. If the transaction involves less than $100 the arrangement is such that nothing will be printed in this position. A blank space on the printing wheel is selected for this purpose. However, if more than $100 is involved in the transaction the appropriate figure will be selected by the dial 15a and the brush arm will be caused to stop on the corresponding segment of the commutator in the same manner as has been explained in relation to the other dial controls.

Substantially the same controls are repeated for the tenth and eleventh positions of the main selector switch and the corresponding positions of the printing wheel. In these columns the rotational position of the printing wheel will be controlled by the dials 15 which will select the desired segments 45 of the commutator on which circuits will be completed through the brush arm 44 to the magnet coil 102.

Stepping of the main selector switch to the tenth position, however, will also energize another circuit by the engagement of arm 78 with contact 205 (Fig. 3B). This contact, when engaged by the arm, connects the positive side of the line 94 with a line 206 which extends to the advancing magnet 138a of the copy counting switch. The circuit is completed from magnet 138a through lines 203 and 204 to the ground at 204a. Condenser 94b will, at this time, be discharged to provide the necessary energy for operation of the counter advancing magnet. Its operation will be performed in the manner explained in connection with Fig. 9. As a result of its operation, the arm 161 will be carried to the second contact 160 and similarly the arm 162 will be carried to the second contact 163 (Fig. 3B).

The entry of the selected item will then continue in the same manner during the next three advances of the carriage and of the main selector switch. In the twelfth position a line 121 serves to connect the contact 80 directly with that segment of the commutator 45 identified with a decimal point so that when this is reached the brush arm and printing wheel will be arrested and the decimal point printed. In the thirteenth and fourteenth positions the main selecting switch will throw the control over the printing wheel to the adjustable dials 15b for recording the number of cents involved in the transaction.

At the fourteenth position the movement of the arm 78 of the selector switch to a contact 207 will serve to connect the positive side of the line with a line 208 which extends over to a resistance 209, the opposite end of which is connected by a line 210 with the resetting coil 146b of the switch identified with the units order of the counting system. From the latter the circuit continues through line 211, resistance 212, and line 213 to the number 1 contact of the copies switch. However, the circuit will be broken at this point since arm 161 will have been previously shifted to the number 2 position. A branch line 214 just in advance of the resistance 212 serves to short circuit the latter when the arm 151 has been shifted 9 steps from the position shown, the by-pass being completed to line 213 through branch line 215. It will be seen, therefore, that sufficient current to cause operation of the resetting devices of the units switch will not be passed through the coil 146b unless the arm 151 is on the 9 position and the arm 161 of the copy counter is on the 1 position shown. The latter condition will prevail only during the final entry of a particular item. In the course of such an entry the resetting coil 146a of the copy counter will be energized in the sixth position of the selector switch and the arm 161 will be restored at this time to a position one below that indicated in Fig. 3B. As the selector switch reaches the 10 position, in the course of this cycle, coil 138a will be energized to advance the arm 161 to the 1 position shown and during this cycle the coil 146b may be energized when the selecting switch reaches the fourteenth position. This, however, is only when the counting arm 151 is in the 9 position as explained because it is only at this time that it is desired to reset the units switch and then, at a later point in the cycle, as will be explained, advance the tens switch one step. By requiring the copy counter arm 161 to be on the 1 position to complete the circuit through coil 146b, the resetting of the units order counting switch, and also the tens and hundreds order switches as will be explained, can take place only during the making of the last copy of a particular entry. This insures printing of the same serial number for each copy of an entry.

Upon stepping of the main selector switch to the fifteenth and sixteenth positions and the corresponding movement of the printing wheel to the fifteenth and sixteenth columns direct connections are provided through a line 121 to a segment of the commutator, such as the carriage return segment, which will predetermine a blank printing operation.

As the printing wheel moves to the seventeenth and succeeding positions and the main selector switch is correspondingly shifted to the seventeenth and succeeding positions the control will next be shifted to the series of current date dials 18. This will be accomplished by connections similar to those indicated in Fig. 5 with respect to the expiration date controls.

In the seventeenth position the character to be printed will be determined by a switch arm similar to 115 of Fig. 5, controlled by a cam projection similar to 118. If the month involved is prior to October a blank will be provided in the seventeenth position of the record, while if the month involved is October, November, or December a 1 will be printed in this position. The operation of the various circuits will be clear from the preceding description. In the course of printing the complete current date the rotational position of the printing wheel will be determined in part by the switch above mentioned, in part by the positioning of the dials 18, and in part by fixed connections through a line similar to line 121 from certain contacts 80 directly to the "dash" selecting segment of the commutator 45. As each character involved in the date is selected under the proper control the printing shaft 51 will be released for a half revolution and the various circuits will be made and broken to continue the recording of the item in the manner explained.

The selection of the remaining characters to be printed will be made in the same manner. Upon completion of the recording of the current date two blank spaces are preferably left on the record card by suitable direct connections from contacts on the main selector switch to the carriage control or other segment of the commutator which predetermines a blank printing operation. Following this, controls similar to those described above for the recording of the current date will be provided from contacts 81 of the main selector switch to the expiration date control dials 20 which will, in turn, cause the stopping of the printing wheel at the appropriate points in the successive positions to record the expiration date that has been set up by the operator. Two more blank spaces may then be provided in the same manner as above explained and finally an appropriate contact 217, of the group 81, will throw the control over, through a line 218 to a collector segment 106 of the copies control dial. Arm 107 of the latter serves to bridge the collector segment to the selected contact of the group 108. These contacts, as previously explained, are connected by line 109 to the control board 4 and through the circuits explained will cause the brush arm 44 to be stopped on the segment of the commutator corresponding with the number of copies selected. In the form of the invention illustrated it is intended to select either 2, 4 or 6 copies. It has been found desirable to make 4 copies of most entries and, therefore, the operation of the apparatus may be speeded up slightly by omitting the recording of this number when the usual number of copies is being made. For this purpose, the contact 108 which is identified with four copies may appropriately be connected with that segment of the commutator which predetermines the printing of a blank in lieu of connecting it with the 4 segment. The printing wheel will then remain in the same rotational position as for the preceding column of the record. It will then be understood that the usual number of copies has been made.

In the illustrative apparatus, the character indicating the number of copies of the particular entry will be recorded in the 37th column of the record with the switch arm 77 on the 37th contact of the main selector switch. As the latter steps to the next and succeeding positions the remaining contacts 81 may select the blank position of the printing wheel by appropriate direct connections from these contacts to the "blank" segment of the commutator. Also on the 40th step of movement of the printing wheel carriage the finger 57 will engage the cam formation 56a of the worm 56 to bring about carriage return in the manner hereinabove explained. If desired, it may be made to occur during the 38th or 39th step of movement of the carriage, by appropriate location of the cam 56a. However, the timing of this operation should be such that the carriage will not be fully returned to its starting position until the shaft 51 has completed its 40th half revolution. During this half revolution of the shaft, the 40th step of movement will be imparted to the main selector switch arms, to bring the latter back to the starting position, i. e. from position 40 to position 1. Here the arm 76 will again engage the contact 80 which is connected with the number 2 segment of the commutator 45 so that, as the magnet 42 is energized upon completion of the half rotation of shaft 51, the brush arm and the printing wheel will be stopped in the 2 position, ready to print the character designating the particular machine at the beginning of the next printing cycle. This character will not be printed during the recording operation under consideration because the circuit through the coil 46 will be broken at this time at the switch 171. The coil 166 will be energized at this time by remaking of the circuit 94, 164, 76, 165, 166, 167, 44, 101, and 102, as explained at the outset. Therefore, the circuit will be broken between arm 171 and line 185 so that detent 49 will not be operated to release the shaft 51. The circuit through dial unlocking coil 173 and lamp 173a will not be completed at the end of the recording cycle described because the copy switch arm 162 (Fig. 3B) will have been shifted to its second contact. However, the circuit mentioned will be completed to unlock the dials and light the lamp at the end of the recording cycle in which the last copy of a particular item has been recorded, since, as will be explained, the arm 162 will be restored to its 1 position in the course of this cycle.

Returning now to the special functions performed in the course of a recording cycle, but not identified with the printing of characters, when the 18th position is reached by the arms of the main selecting switch, the arm 79 will engage contact 219 which is connected by line 220 with one end of a coil 138b identified with the units order switch of the counter. The opposite terminal of this coil is connected by line 213 with the number 1 contact of the copies switch. In the particular operation under consideration the circuit will be broken at this point since the arm 161 will have been previously shifted to the number 2 contact. However, in the course of printing the last copy of a particular entry the arm 161 will be on the number 1 contact at this particular time in the cycle, as explained above, so that the circuit will be completed through line 204 to ground and will, therefore, cause the units order of the counter to be advanced one step because of the energization of coil 138b. It should be noted in this connection that in the printing of the last copy of an entry, the copies switch will have been restored to a position one below the number 1 contact 160 by energizing coil 146a in the sixth position of the main selector switch and the arm 161 will have been advanced one step to the number 1 contact upon the subsequent energizing of the magnet 138a at the tenth position of the main selector switch.

When the main selector switch has been stepped around to its 22nd position the arm 79 will engage contact 221 which is connected by line 222 with one end of a resistance 223, the opposite end of which is connected by a line 224 with a coil 146c identified with the tens order of the counting system. Coil 146c, it will be understood, serves to reset the tens order switch at the appropriate time. In the particular cycle of operation illustrated and being described, the coil 146c will not be effective to reset the switch because the circuit will be broken at another point along the line. It extends from the coil 146c through a resistance 225, thence through a line 226 to a line 227 connected with the 0 contact 152 of the units order switch. In the course of the entry now under consideration the arm 151 of this switch will have been shifted to the number 2 contact 152, so that the circuit is broken at this point. However, the circuit will be completed at this point under certain circumstances, i. e., during a recording operation in which the resetting coil 146b has been operated to reset the arms 128 and 151, to a position one step below those illustrated, and coil 138b has been subsequently energized to advance the arms 128 and 151 to the 0 position. This will have occurred during an operation in which the arm 151 was engaged with the last or number 9 contact of the series 152, from which line 214 extends. However, the circuit which will then be extended from line 227, through arm 151, line 215 and line 213, will be completed only when the copies counter arm 151 is in the 1 position. That, as previously explained, will take place in the course of the recording of the last copy of a particular entry. It should be noted, in this connection, that the arm 161 will have been reset to a point one step below the number 1 contact and will have then been advanced one step to the number 1 position by the time the arm 78 of the main selector switch has reached its 10th step. However, while a circuit is thus completed through the coil 146c, the combination of resistances 223 and 225 is such that the current flow will be small and will be inadequate to operate the resetting devices. Resetting will occur only when one of these resistances has been by-passed. This will happen to resistance 225 when arm 153 reaches its 9th position where it engages a contact connected by a line 228 with the line from coil 146c, the inner end of arm 153 being connected by a line 229 with the line 226. At this time adequate current will flow through the coil 146c to effect the resetting of the tens order switch when all of the other conditions described have been met. The net result of the foregoing is to reset the tens order switch only in an operation in which the arms 128 and 153 of this switch are in their 9th positions while the arm 151 of the units order switch is in its 0 position and the copy counter 161 is in the 1 position. This condition can occur only during a cycle in which the last copy of a particular entry is being made and in which the two lower orders of the counter are being moved from 99 to 00.

As the arm 79 of the main selector switch reaches its 26th position it engages a contact 230 which is connected by a line 231 with a coil 138c adapted to advance the arms of the tens order switch a step at a time. The circuit from coil 138c is completed through lines 226 and 227 in the same manner as the circuit is completed through coil 146c as explained. However, it is not necessary that the arm 153 be in its 9th position since adequate current to operate the advancing magnet 138c will flow through the latter whenever the circuit is completed by engagement of arm 151 with its 0 contact and arm 161 with its number 1 contact.

On reaching the 30th position, arm 79 of the main selector switch engages a contact 232 which is connected by a line 233 with a resistance 234, the opposite end of which is connected by a line 235 with a resetting coil 146d associated with the hundreds order switch of the counter. The opposite side of coil 146d is connected through a resistance 236 and line 237 with the 0 contact 154 of the tens order switch of the counter. The circuit at this point can be completed only when the arm 153 is in its 0 position, at which time the circuit extends through lines 229, 226 and 227 to the 0 contact for the arm 151. The circuit is completed at this point only when arm 151 is in the 0 position, at which time it extends through lines 215 and 213 to the number 1 contact of the copies switch. From this point the circuit is completed by the arm 161 and line 204 but only when the arm 161 is in the number 1 position. Here again the circuit that is thus completed has a total resistance, due to the resistances 234 and 236 in series, of such magnitude that inadequate current will flow to operate the resetting means for the hundreds order. However, when arm 155 is in its 9th position the resistance 236 will be by-passed or short-circuited, by line 238, arm 155, and line 239, so that at this time the magnet 146d will be effective to reset the hundreds order counter. This, it will be seen, can occur only when arm 155 is in its 9th position, arms 153 and 151 are in their 0 positions, and arm 161 is in its number 1 position. Thus it occurs only when the counter system is passing from 999 back to 000 in the course of recording the last copy of entry number 999.

As the main selector switch is stepped further, to its 34th position, arm 79 engages contact 240 which is connected by a line 241 with a coil 138d that operates the step by step advancing means for the hundreds order counter. The circuit is completed from coil 138d through line 237, arm 153, lines 229, 226, and 227, arm 151, lines 215 and 213, arm 161 and line 204 to ground. This can occur, however, only when the copy counter arm 161 is in its number 1 position and the units and tens order counter arms 151 and 153 are in their 0 positions. It is only at this time that another step should be given to the hundreds switch arm.

On reaching the 38th position, the arm 79 of the main selector switch engages a contact 242 which is connected by a line 243 with a magnet 244 adapted to operate the counter 23 which indicates the number of items entered on the machine. From the coil 244, a line 245 extends to the second contact of the group 163 on the copy counter. Thus at this stage in the operation, 1 will be added to the total on the counter 23. This occurs only during the second entry of a particular item. It will be understood that at least two copies are always to be made of any entry and, therefore, it is satisfactory to operate the counter 23 on the making of the second copy. The circuit will, of course, be completed at this time through the arm 162 and the line to ground at 176. Preferably no provision is made for resetting the counter 23, so that this will at all times indicate the total number of entries made on the machine. After the maximum number of entries capable of being counted on this counter has been entered, it will, of course, pass to a 0 indication. If desired, however, a resetting means under control of a supervisor may be provided.

The coil 244, or a second similar coil either in series or in parallel with coil 244, may serve to operate the counter 24 at the same time. This counter, however, is provided with resetting means operable by the rock member 25 at the will of the operator of the machine, since it is provided simply for the convenience of the operator. It enables a quick computation to be made of the amount of money involved in a series of transactions based upon the same subscription rate. Thus, if 500 entries are indicated by the counter 24 of a group of $20 subscriptions, the total amount involved in the transactions will readily be computed at $10,000.

After completion of the entry in the manner above explained, the main selector switch will still have a number of steps of movement before the switch arms are brought back to their initial positions. Thus the recording of the complete entry, in the arrangement illustrated and described, may require 36 or 37 different positions of the switch arms, and a corresponding number of positions of the printing wheel across the record sheet, depending upon whether the number of copies made is to be recorded at the end of the entry. Since 40 steps are required to bring the switch arms back to their original or number 1 positions there will remain 4 or 5 steps of movement after completion of the entry. In each of the positions 38, 39, and 40, which are reached upon the 37th, 38th, and 39th steps of movement of the selector switch arms, the contacts are connected directly with the space or carriage return segment of the commutator 45. This segment of the commutator and printing wheel may also be selected in the 37th position, if the copy dial is adjusted to its number 4 position, as explained above. Return of the carriage toward the right (Fig. 1) may commence at any appropriate point in the recording cycle after the platen 55b has been operated for the 37th position of the printing wheel. It may occur during the 38th half revolution of shaft 51 or be delayed until the 39th or 40th half revolution of shaft 51, if desired, by suitably locating the cam surface 56a. The timing should be such, however, that the carriage is not fully restored toward the right, to re-engage the finger 57 with worm 56, until shaft 51 has completed its 40th half revolution.

The time required for the return of the carriage is greater than that required for the printing of a single character and, therefore, it is possible to allow several positions of the main selector switch for its return. This is by no means necessary, however, since the carriage will return more quickly than the operator can remove the record card and insert a new one. Due to the fact that the carriage return or space position of the printing wheel will be selected for each of the final steps of the main selector switch arms, the operation of the platen 55b will have no effect.

During the 40th half revolution of the shaft 51 which causes cam member 191 to close and then open the circuit through the stepping coil 89 to shift the selector switch arms from their 40th position back to the number 1 or first position, arm 76 will again engage the first contact of group 89, which, as before explained, is connected with that segment of the commutator 45 which selects the number that identifies the particular machine. In the example described above, this is the number 2, so that upon this cycle of operation of the machine the commutator brush arm and the printing wheel will be turned to present the number 2 at the printing position. Printing of the character will not take place at this time, however, because the circuit through the coil 46, which releases the print shaft 51, will be broken at the switch 171. This is due to the closing of the circuit between lines 165 and 167, when the selector switch is returned to the number 1 position, with consequent energization of the magnet coil 166. Upon completion of this cycle of the various devices the circuits will all be restored to the condition indicated in Figs. 3A and 3B, with the exception that the circuit through line 175, lock release magnet 173, lamp 173a, etc. will not be completed since the arm 162 of the copy counting switch will not, at this time, be in the 1 position. The circuit just mentioned will be completed only after the recording of the last copy of the particular entry, at which time the copy counting switch will have been reset and then restored to the position indicated in Fig. 3B. Prior to this, however, for the recording of the second copy of an entry, it is simply necessary to depress the starting button or switch 9, after the new record medium has been inserted in printing position, and the same cycle of operations will be repeated to record the item again. After the selected number of copies has been produced in this way, the circuit through line 175 will be completed, as explained, and the dials will be released for readjustment, due to energization of the magnet 173, and the dials will be illuminated by the lamp 173a. A new entry may then be set up and the same cycles of operation repeated.

At the end of a day, or at the commencement of a new day, the supervisor will cause resetting of the apparatus, including the copy counting switch and the three switches of the item counting and recording mechanism. For this purpose, as explained at the outset, the supervisor turns the lock 26. The barrel or revolving member of this lock is connected in any suitable manner (not shown) with a switch bar 251 (Fig. 3B) having a plurality of contacts 252 adapted to be engaged with the contacts represented by the arrow heads. Movement of the switch bar toward the right, by the turning of the lock, will cause engagement of the contacts mentioned and will serve, among other things, to short circuit the four resistances 200, 209, 223, and 234. Also, as will be explained, it serves to couple the 18th and 38th contacts of the main selector switch which are engaged by the arms 78 and 79. Suitable linkage (not shown) may connect the barrel of the lock with a locking member, similar to 181 of Fig. 5, to release the same from the current date dials. The supervisor may then adjust these dials to indicate the new date.

When the resetting switch 251 is operated and the main lock controlled switch 8 is also turned, depression of the starting button 9 will cause the machine to follow through a recording operation in substantially the same manner as hereinabove explained. However, the resetting coils 146 of the various counting switches will be energized at the appropriate times regardless of the positions in which their arms happen to be located. Thus, as the arm 78 of the main selector switch reaches the 6th position, i. e., contact 198, the circuit will be completed from line 94 through line 94a, arm 78 and line 199 to line 201, without passing through the resistance 200. From line 201 the circuit continues through resetting coil 146a, resistance 202, lines 203 and 204 to the grounded side of the circuit. Condenser 94b will, therefore, be discharged and will supply sufficient current to bring about resetting of the arms 161 and 162 to a position one step below that indicated in Fig. 3B. As arm 78 reaches the 10th position, i. e. contact 205, a circuit is completed, as before, through the coil 138a to advance the copy counter switch to the number 1 position shown. When arm 78 of the main selector switch reaches the 14th position, i. e. contact 207, the circuit will be completed through line 208 directly to line 210, without going through the resistance 209 and will continue through coil 146b, resistance 212, line 213, arm 161 and line 204 to the grounded side of the circuit. The condenser 94b will be discharged and since resistance 209 has been eliminated, the current will be sufficient to cause resetting of the units order counter at this time. The arms 128 and 151 will be reset to a position one step below that shown. However, as the main selector arm 78 reaches the 18th position, or contact 219, a circuit will be completed through the coil 138b in the manner previously explained to cause the units order counter to advance one step to the position shown. In a smiliar manner, circuits will be completed through the resetting coils 146c and 146d as the main selector switch arms reach their 22nd and 30th positions, respectively, while coils 138c and 138d will be energized as the main selector switch arms reach the 26th and 34th positions, respectively. As a result, the tens and hundreds orders switches will be reset, in sequence, to a position one step below their 0 positions and will be advanced one step to their 0 positions.

As the main selector switch arm 79 reaches the 38th position, it will engage a contact connected by a line 253 over to the point 253a of the resetting switch. Here the circuit will be completed to the switch arm 252 which is connected by a line 254 with the contact 219 in the 18th position of the main selector switch. This contact, as previously explained, is connected by line 220 with the coil 138b of the units order counter switch. From the latter the circuit is completed through line 213, arm 161, and line 204 to the grounded side. Accordingly, the units order switch will be advanced one step further, i. e. to the 1 position. This enables the completion of another circuit upon the return of the switch arm 78 to its initial or number 1 position. At this point a circuit will be completed from line 94, through line 94a, arm 78, contact 255, resistance 256, and line 257, to the juncture of the latter at 258 with the line 226. This circuit will continue through line 226 to line 229, then through arm 153 to the first or 0 contact of the tens counter switch, with which it will, at this time, be engaged. From here the circuit extends through line 237 to line 239 and thence through arm 155 to a line 259 which extends from the 0 contact of the hundreds order switch, on which arm 155 rests at this time. Line 259 carries, in series, a lamp 260 and a resistance 261 beyond which the line extends to the number 1 contact of the units order counter switch, on which the arm 151 rests at this time. It will be apparent that the circuit is completed through lines 215, 213, arm 161 and line 204 to ground. Lamp 260 corresponds with lamp 25 of Fig. 1 and serves to indicate to the supervisor that the machine has been properly restored and is ready for the days operation. The counter system will, at this time, be in the 001 position to indicate that entry number 1 is being made when the operator first operates the machine.

Turning of the lock 26 to restore the switch arm 251 to its normal position, shown in Fig. 3B, will still leave the circuit completed through the lamp 260, as above described, until the arm 78 of the main selector switch has been shifted to its next position.

The stop switch 30, of Fig. 1, may be placed in series with the switch 172 (Fig. 3A) so that when it is shifted to the stop position, it will cut off power to the magnet 46. This will stop the recording cycle and permit the operator to adjust the record medium or call the service department if some more serious difficulty is encountered. When this switch is returned to the "on" position the previous condition of the machine will be restored, regardless of the point in its operation at which it was stopped.

While an illustrative machine has been described in considerable detail, it will be understood that various modifications and additions may be made without departing from the general principles and scope of the invention. Suitable locking and interlocking devices, in addition to those described, may, for example, be employed. Also, the specific set-up may be varied to suit the requirements of various different types of business.

What we claim is:

1. Recording apparatus which comprises a printing wheel mounted for axial movement to successive printing positions across a record receiving medium, means for rotating said wheel to select the characters to be printed in the successive positions, means including manually adjustable devices for controlling the rotations of the wheel to select the characters to be printed, and means cooperating with said controlling means for compelling a repetition of the same selection of characters a predetermined number of times, said last mentioned means including devices for locking said adjustable devices until such repetition has been completed.

2. Recording apparatus which comprises a first shaft constantly driven in one direction, a second shaft driven intermittently by said first shaft, a printing wheel shiftable axially along said second shaft and rotatable therewith, a third shaft driven intermittently by said first shaft during periods of rest of said second shaft, a plurality of control means for predetermining the angular positions in which said second shaft is arrested, means operated by said third shaft for taking an impression from said printing wheel while said second shaft is at rest, means for shifting said wheel axially to successive positions as an incident to the taking of said impressions, and means coordinating each axial position of said wheel with a particular one of said control means.

3. Recording apparatus which comprises a first shaft constantly driven in one direction, a second shaft driven intermittently by said first shaft, a printing wheel shiftable axially along said second shaft and rotatable therewith, a third shaft driven intermittently by said first shaft during periods of rest of said second shaft, a plurality of control means for predetermining the angular positions in which said second shaft is arrested, certain of said control means being manually adjustable, means operated by said third shaft for taking an impression from said printing wheel while said second shaft is at rest, means for shifting said wheel axially to successive positions as an incident to the taking of said impressions, and means coordinating each axial position of said wheel with a particular one of said control means.

4. Recording apparatus which comprises a first shaft constantly driven in one direction, a second shaft driven intermittently by said first shaft, a printing wheel shiftable axially along said second shaft and rotatable therewith, a third shaft driven intermittently by said first shaft during periods of rest of said second shaft, a plurality of control means for predetermining the angular positions in which said second shaft is arrested, certain of said control means being manually adjustable, other of said control means being automatically variable upon operation of the apparatus, means operated by said third shaft for taking an impression from said printing wheel while said second shaft is at rest, means for shifting said wheel axially to successive positions as an incident to the taking of said impressions, and means coordinating each axial position of said wheel with a particular one of said control means.

5. Recording apparatus which comprises a first shaft constantly driven in one direction, a second shaft driven intermittently by said first shaft, a printing wheel shiftable axially along said second shaft and rotatable therewith, a third shaft driven intermittently by said first shaft during periods of rest of said second shaft, a plurality of control means for predetermining the angular positions in which said second shaft is arrested, certain of said control means being manually adjustable, other of said control means being automatically variable upon operation of the apparatus, and still other of said control means being arranged to predetermine a definite angular position of said shaft, means operated by said third shaft for taking an impression from said printing wheel while said second shaft is at rest, means for shifting said wheel axially to successive positions as an incident to the taking of said impressions, and means coordinating each axial position of said wheel with a particular one of said control means.

6. Recording apparatus which comprises a first shaft constantly driven in one direction, a second shaft driven intermittently by said first shaft, a printing wheel shiftable axially along said second shaft and rotatable therewith, a third shaft driven intermittently by said first shaft during periods of rest of said second shaft, a plurality of control means for predetermining the angular positions in which said second shaft is arrested, said control means comprising multi-contact circuit closing means arranged to close different circuits selectively, means operated by said third shaft for taking an impression from said printing wheel while said second shaft is at rest, means for shifting said wheel axially to successive positions as an incident to the taking of said impressions, and means coordinating each axial position of said wheel with a particular one of said control means.

7. Recording apparatus which comprises a first shaft constantly driven in one direction, a second shaft driven intermittently by said first shaft, a printing wheel shiftable axially along said second shaft and rotatable therewith, a third shaft driven intermittently by said first shaft during periods of rest of said second shaft, a plurality of control means for predetermining the angular positions in which said second shaft is arrested, said control means comprising a plurality of multi-contact circuit closing means arranged to close different circuits selectively, means operated by said third shaft for taking an impression from said printing wheel while said second shaft is at rest, means for shifting said wheel axially to successive positions as an incident to the taking of said impressions, and multi-contact circuit closing means operated in synchronism with the axial movements of said printing wheel for selecting different ones of said plurality of circuit closing means to be effective in different axial positions of said wheel.

8. Recording apparatus which comprises means for supporting a record medium, a printing wheel shiftable axially to successive positions across the record medium, means for rotating said wheel to present different characters for printing upon said medium in the successive positions, a plurality of variable control means and electrical connections therefrom for predetermining the characters to be printed in different axial positions of said wheel, means for causing the selected characters to be printed on the record medium to make an entry thereon, means coordinated with the axial movements of said wheel for determining which of said variable control means shall be effective in different axial positions of said wheel, means for automatically returning said printing wheel axially to its starting position upon completion of an entry, and means including devices for retaining said variable control means in a set position until a repetition of the same entry has been made a predetermined number of times.

9. Recording apparatus which comprises means for supporting a record medium, a printing wheel shiftable axially to successive positions across the record medium, means for rotating said wheel to present different characters for printing upon said medium in the successive positions, a plurality of variable control means and electrical connections therefrom for predetermining the characters to be printed in different axial positions of said wheel, means for causing the selected characters to be printed on the record medium to make an entry thereon, means coordinated with the axial movements of said wheel for determining which of said variable control means shall be effective in different axial positions of said wheel, means for automatically returning said printing wheel axially to its starting position upon completion of an entry, means including devices for retaining said variable control means in a set position until a repetition of the same entry has been made a predetermined number of times, and adjustable means for determining the number of repetitions of an entry to be made.

10. Recording apparatus which comprises means for supporting a record medium, a printing wheel shiftable axially to successive positions across the record medium, means for rotating said wheel to present different characters for printing upon said medium in the successive positions, a plurality of variable control means and electrical connections therefrom for predetermining the characters to be printed in different axial positions of said wheel, said variable control means including means adjusted automatically upon operation of the apparatus for predetermining the printing of consecutive numbers, means for causing the selected characters to be printed on the record medium to make an entry thereon, means coordinated with the axial movements of said wheel for determining which of said variable control means shall be effective in different axial positions of said wheel, means for automatically returning said printing wheel axially to its starting position upon completion of an entry, and means including devices for retaining said variable control means in a set position until a repetition of the same entry has been made a predetermined number of times, said automatically adjusted means being adjusted to predetermine printing of the next higher number only once during the printing of the predetermined number of entries.

11. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, control means including a plurality of multi-position switches and electrical connections therefrom for selecting the successive characters to be printed, main selector switch means automatically operable to activate said multi-position switches in sequence for selection of the successive characters, and means associated with said main selector switch means for effecting automatic readjustment of said multi-position switches to change the characters selected thereby in the course of a series of cycles of operations of the apparatus, said last mentioned means including devices for causing said readjustment only during certain cycles of operation of the apparatus.

12. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, control means including a plurality of multi-position switches and electrical connections therefrom for selecting the successive characters to be printed, main selector switch means automatically operable to activate said multi-position switches in sequence for selection of the successive characters, and means associated with said main selector switch means for effecting automatic readjustment of said multi-position switches to change the characters selected thereby in the course of a series of cycles of operations of the apparatus, said last mentioned means including devices for causing said readjustment only after a predetermined number of cycles of operation of the apparatus, certain of said devices being adjustable to vary said predetermined number of cycles at will.

13. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, commutator means including a multi-segment member and a contact member, one of said members being connected with said wheel for rotation therewith relative to the other of said members, a plurality of electrical circuits arranged to be closed selectively upon engagement of said contact member with selected segments of said multi-segment member, means for arresting relative rotation of said members upon the closing of one of said circuits, a plurality of adjustable means adapted to select circuits to be closed, and means operable upon the operation of the apparatus for rendering different ones of said adjustable means effective upon successive operations of the apparatus.

14. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, commutator means including a multi-segment member and a contact member, one of said members being connected with said wheel for rotation therewith relative to the other of said members, a plurality of electrical circuits arranged to be closed successively upon engagement of said contact member with selected segments of said multi-segment member, means for arresting relative rotation of said members upon the closing of one of said circuits, a plurality of adjustable means adapted to select circuits to be closed, means operable upon the operation of the apparatus for rendering different ones of said adjustable means effective upon successive operations of the impression taking means in the course of a predetermined cycle, and means for automatically readjusting certain of said adjustable means during one cycle to effect a different control during a subsequent cycle.

15. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, commutator means including a multi-segment member and a contact member, one of said members being connected with said wheel for rotation therewith relative to the other of said members, a plurality of electrical circuits arranged to be closed successively upon engagement of said contact member with selected segments of said multi-segment member, means for arresting relative rotation of said members upon the closing of one of said circuits, a plurality of adjustable means adapted to select circuits to be closed, means operable upon the operation of the apparatus for rendering different ones of said adjustable means effective upon successive operations of the impression taking means, said last mentioned means being effective to readjust said adjustable means during certain cycles of a plurality and not during others, and means adjustable at will for predetermining the cycles during which said means will be effective.

16. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, and a plurality of adjustable control means in said circuits for controlling the rotation of said wheel to select the characters to be printed, each of said control means being capable of selecting any one of a plurality of different characters and each being electrically connected with and rendered effective by a different one of said contacts.

17. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, and means for compelling a repetition of the same entry on at least one subsequent operation of said initiating means.

18. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including a multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, means for compelling a repetition of the same entry on at least one subsequent operation of said initiating means, and means adjustable by the operator for varying the number of repetitions of the same entry to be compelled.

19. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, and a plurality of adjustable control means in said circuits for controlling the rotation of said wheel to select the characters to be printed, each of said control means being capable of selecting any one of a plurality of different characters and each being electrically connected with and rendered effective by a different one of said contacts, at least some of said control means being adjustable manually.

20. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, and a plurality of adjustable control means in said circuits for controlling the rotation of said wheel to select the characters to be printed, each of said control means being capable of selecting any one of a plurality of different characters and each being electrically connected with and rendered effective by a different one of said contacts, some of said control means being adjustable manually and others being adjusted automatically by operation of the apparatus.

21. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, and a plurality of adjustable control means in said circuits for controlling the rotation of said wheel to select the characters to be printed, each of said control means being capable of selecting any one of a plurality of different characters and each being electrically connected with and rendered effective by a different one of said contacts, certain of said control means being rendered effective by a plurality of said contacts.

22. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, and means for adjusting certain of said control means automatically upon operation of the apparatus to cause selection of characters in a predetermined sequence at co-related positions of said wheel.

23. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, means for adjusting certain of said control means automatically upon operation of the apparatus to cause selection of characters in a predetermined sequence at co-related positions of said wheel, and manually operable means for modifying the action of said adjusting means to cause automatic restoration of said certain control means to a definite position.

24. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, certain of said control means being adjustable manually, means for locking said certain control means upon actuation of said operation initiating means, and means for maintaining said locking means effective until a predetermined number of entries have been made.

25. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impression taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, certain of said control means being adjustable manually, means for locking said certain control means upon actuation of said operation initiating means, means for maintaining said locking means effective until a predetermined number of entries have been made, and means for visually indicating when said lock is effective.

26. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impressing taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, and means for automatically adjusting certain of said control means upon operation of the apparatus, said last mentioned means comprising additional contacts and connected circuits associated with said multi-contact switch means rendered effective in a predetermined sequence in the course of recording an entry.

27. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impressing taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, means for automatically adjusting certain of said control means upon operation of the apparatus, said last mentioned means comprising additional contacts and connected circuits associated with said multi-contact switch means rendered effective in a predetermined sequence in the course of recording one of a plurality of like entries, and adjustable means for determining the number of like entries to be made and for causing said automatic adjusting means to be effective during the recording of only one of said entries.

28. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impressing taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, means for automatically adjusting certain of said control means upon operation of the apparatus, said last mentioned means comprising additional contacts and connected circuits associated with said multi-contact switch means rendered effective in a predetermined sequence in the course of recording one of a plurality of like entries, adjustable means for determining the number of like entries to be made and for causing said automatic adjusting means to be effective during the recording of only one of said entries, and manually operable means for causing said automatic adjusting means to restore said certain of said control means to a definite starting position.

29. Recording apparatus which comprises means for supporting a record medium, a rotatable printing wheel adjacent said supporting means having characters thereon adapted to be printed, means for rotating said wheel to position a selected character to be printed, means for taking an impression from said selected character, means for shifting said wheel relative to said supporting means to cause printing in successive columns on said record medium, means for initiating an operation of the apparatus to record an entry in which said impressing taking means and said wheel shifting means are operated a predetermined number of times, an electric power source, connections therefrom including a plurality of different circuits for controlling the selection of characters and the operation of said impressing taking means and said wheel shifting means, said connections including multi-contact switch means having a contact corresponding with each operation of said impression taking means, only one of said contacts being active during each of said operations, means for rendering said contacts effective in sequence, a plurality of adjustable control means in said circuits for controlling the rotation of said wheel to select the characters to be printed, each of said control means being capable of selecting any one of a plurality of different characters and each being electrically connected with and rendered effective by a different one of said contacts, means for automatically adjusting certain of said control means upon operation of the apparatus, said last mentioned means comprising additional contacts and connected circuits associated with said multi-contact switch means rendered effective in a predetermined sequence in the course of recording one of a plurality of like entries, adjustable means for determining the number of like entries to be made and for causing said automatic adjusting means to be effective during the recording of only one of said entries, manually operable means for causing said automatic adjusting means to restore said certain of said control means to a definite starting position, other of said control means being manually adjustable, means for locking certain of said other control means, and means for releasing said locking means upon operation of said manually operable means.

30. Recording apparatus which comprises means for supporting a record medium, a printing wheel rotatable to select characters to be printed, means for rotating said wheel, means for controlling said wheel rotating means to select the characters to be printed, means for shifting said wheel axially step-by-step relative to said supporting means, means for taking an impression from said wheel in each of its axial positions to provide an entry on said record medium, means for operating said wheel rotating and shifting means and said impression taking means, means for initiating an operation of said operating means and causing the same to continue through a cycle to record a complete entry, and means controlled by said last mentioned means for shearing a marginal section from the record medium and for retaining the record medium on said supporting means throughout the recording of the entry.

31. Recording apparatus which comprises means for supporting a record medium, a printing wheel rotatable to select characters to be printed, means for rotating said wheel, means for controlling said wheel rotating means to select the characters to be printed, means for shifting said wheel axially step-by-step relative to said supporting means, means for taking an impression from said wheel in each of its axial positions to provide an entry on said record medium, means for operating said wheel rotating and shifting means and said impression taking means, means for initiating an operation of said operating means and causing the same to continue through a cycle to record a complete entry, said controlling means including manually adjustable members, and means for locking said members upon operation of said initiating means and retaining the same in locked condition until a predetermined number of complete entries have been recorded.

32. Recording apparatus which comprises means for supporting a record medium, a printing wheel rotatable to select characters to be printed, means for rotating said wheel, means for controlling said wheel rotating means to select the characters to be printed, means for shifting said wheel axially step-by-step relative to said supporting means, means for taking an impression from said wheel in each of its axial positions to provide an entry on said record medium, means for operating said wheel rotating and shifting means and said impression taking means, means for initiating an operation of said operating means and causing the same to continue through a cycle to record a complete entry, said controlling means including manually adjustable members, means for locking said members upon operation of said initiating means and retaining the same in locked condition until a predetermined number of complete entries have been recorded, and manually adjustable means for varying said predetermined number of entries.

33. Recording apparatus which comprises means for supporting a record medium, a printing wheel rotatable to select characters to be printed, means for rotating said wheel, means for controlling said wheel rotating means to select the characters to be printed, means for shifting said wheel axially step-by-step relative to said supporting means, means for taking an impression from said wheel in each of its axial positions to provide an entry on said record medium, means for operating said wheel rotating and shifting means and said impression taking means, means for initiating an operation of said operating means and causing the same to continue through a cycle to record a complete entry, said controlling means including manually adjustable members, means for locking said members upon operation of said initiating means and retaining the same in locked condition until a predetermined number of complete entries have been recorded, manually adjustable means for varying said predetermined number of entries, and means providing a visual indication when said locking means is released.

34. Recording apparatus which comprises means for supporting a record medium, a printing wheel rotatable to select characters to be printed, means for rotating said wheel, means for controlling said wheel rotating means to select the characters to be printed, means for shifting said wheel axially step-by-step relative to said supporting means, means for taking an impression from said wheel in each of its axial positions to provide an entry on said record medium, means for operating said wheel rotating and shifting means and said impression taking means, means for initiating an operation of said operating means and causing the same to continue through a cycle to record a complete entry, said controlling means including adjustable devices, and means for automatically adjusting certain of said devices to cause the same to bring about the recording of consecutive numbers as a part of the entries being made, said last mentioned means being arranged to effect said automatic adjustment only during the recording of one of a predetermined number of entries.

35. Recording apparatus which comprises means for supporting a record medium, a printing wheel rotatable to select characters to be printed, means for rotating said wheel, means for controlling said wheel rotating means to select the characters to be printed, means for shifting said wheel axially step-by-step relative to said supporting means, means for taking an impression from said wheel in each of its axial positions to provide an entry on said record medium, means for operating said wheel rotating and shifting means and said impression taking means, means for initiating an operation of said operating means and causing the same to continue through a cycle to record a complete entry, said controlling means including adjustable devices, means for automatically adjusting certain of said devices to cause the same to bring about the recording of consecutive numbers as a part of the entries being made, said last mentioned means being arranged to effect said automatic adjustment only during the recording of one of a predetermined number of entries, and manually adjustable means for varying said predetermined number of entries.

36. Recording apparatus which comprises means for supporting a record medium, a printing wheel rotatable to select characters to be printed, means for rotating said wheel, means for controlling said wheel rotating means to select the characters to be printed, means for shifting said wheel axially step-by-step relative to said supporting means, means for taking an impression from said wheel in each of its axial positions to provide an entry on said record medium means for operating said wheel rotating and shifting means and said impression taking means, means for initiating an operation of said operating means and causing the same to continue through a cycle to record a complete entry, said controlling means including adjustable devices, means for automatically adjusting certain of said devices to cause the same to bring about the recording of consecutive numbers, as a part of the entries being made, and lock controlled means for causing restoration of said certain of said devices to a definite position in the course of recording an entry.

37. In apparatus of the class described in which a printing wheel is rotated to select characters to be printed and is shifted axially to print in different columns on a record medium and provide an entry thereon, the combination of a plurality of settable multi-contact switches and electrical circuits and devices associated therewith for controlling the printing of consecutive numbers in a plurality of said columns, each of said switches being identified with a denominational order of the number, selector switch means for rendering said multi-contact switches effective in sequence, and means co-ordinated with said selector switch means for changing the setting of one or more of said multi-contact switches in the course of printing an entry to cause the next higher consecutive number to be printed as a part of a succeeding entry.

38. In apparatus of the class described in which a printing wheel is rotated to select characters to be printed and is shifted axially to print in different columns on a record medium and provide an entry thereon, the combination of a plurality of settable multi-contact switches and electrical circuits and devices associated therewith for controlling the printing of consecutive numbers in a plurality of said columns, each of said switches being identified with a denominational order of the number, selector switch means for rendering said multi-contact switches effective in sequence and means co-ordinated with said selector switch means for changing the setting of one or more of said multi-contact switches in the course of printing an entry to cause the next higher consecutive number to be printed as a part of a succeeding entry, said last mentioned means comprising devices for advancing and resetting said multi-contact switches and means for controlling the operation thereof in sequence, when and as a change in setting is called for.

39. In apparatus of the class described in which a printing wheel is rotated to select characters to be printed and is shifted axially to print in different columns on a record medium and provide an entry thereon, the combination of a plurality of settable multi-contact switches and electrical circuits and devices associated therewith for controlling the printing of consecutive numbers in a plurality of said columns, each of said switches being identified with a denominational order of the number, selector switch means for rendering said multi-contact switches effective in sequence, and means co-ordinated with said selector switch means for changing the setting of one or more of said multi-contact switches in the course of printing an entry to cause the next higher consecutive number to be printed as a part of a succeeding entry, said last mentioned means including manually variable control means for causing said change in the setting of said switches to occur only once in the course of printing a variable number of entries so that the same consecutive number will be printed as a part of all of said number of entries.

40. In apparatus of the class described in which a printing wheel is rotated to select characters to be printed and is shiftable axially to print in different columns on a record medium and provide an entry thereon, the combination of a plurality of switches each having ten contacts and an arm movable step-by-step from one contact to another, each of said switches being identified with a denominational order of a number, circuits and devices adapted to be energized in accordance with the contacts engaged by said arms for controlling the printing of consecutive numbers in a plurality of said columns on the record medium, selector switch means for rendering said ten-contact switches effective in sequence, devices for advancing and resetting each of said ten-contact switches, and means coordinated with said selector switch means for controlling the operation of said devices in sequence when and as a change in the setting of said arms is called for to cause the printing of the next higher consecutive number.

41. In apparatus of the class described in which a printing wheel is rotated to select characters to be printed and is shifted axially to print in different columns on a record medium and provide an entry thereon, the combination of a plurality of switches each having ten contacts and an arm movable step-by-step from one contact to another, each of said switches being identified with a denominational order of a number, circuits and devices adapted to be energized in accordance with the contacts engaged by said arms for controlling the printing of consecutive numbers in a plurality of said columns on the record medium, selector switch means for rendering said ten-contact switches effective in sequence, devices for advancing and resetting each of said ten-contact switches, and means coordinated with said selector switch means for controlling the operation of said devices in sequence when and as a change in the setting of said arms is called for to cause the printing of the next higher consecutive number, said devices being arranged to restore said arm of any of said switches to a position one step below the first of said contacts and then advance the same to said first contact whenever the number to be printed under control of said switch is to change from 9 to 0.

42. In apparatus of the class described in which a printing wheel is rotated to select characters to be printed and is shiftable axially to print in different columns on a record medium and provide an entry thereon, the combination of a plurality of switches each having ten contacts and an arm movable step-by-step from one contact to another, each of said switches being identified with a denominational order of a number, circuits and devices adapted to be energized in accordance with the contacts engaged by said arms for controlling the printing of consecutive numbers in a plurality of said columns on the record medium, selector switch means for rendering said ten-contact switches effective in sequence, devices for advancing and resetting each of said ten-contact switches, and means coordinated with said selector switch means for controlling the operation of said devices in sequence when and as a change in the setting of said arms is called for to cause the printing of the next higher consecutive number, said last recited means including a multi-contact switch having an arm shiftable step-by-step to successive contacts, means for advancing said arm one step upon the printing of each entry, and means for enabling the operation of appropriate ones of said devices in sequence only when said multi-contact switch arm is on a predetermined contact.

43. In apparatus of the class described in which a printing wheel is rotated to select characters to be printed and is shifted axially to print in different columns on a record medium and provide an entry thereon, the combination of a plurality of settable multi-contact switches and electrical circuits and devices associated therewith for controlling the printing of consecutive numbers in a plurality of said columns, each of said switches being identified with a denominational order of the number, selector switch means for rendering said multi-contact switches effective in sequence, means coordinated with said selector switch means for changing the setting of one or more of said multi-contact switches in the course of printing an entry to cause the next higher consecutive number to be printed as a part of a succeeding entry, said last mentioned means including manually variable control means for causing said change in the setting of said switches to occur only once in the course of printing a variable number of entries so that the same consecutive number will be printed as a part of all of said number of entries, an indicating register, and means for operating said register to add a unit to the total thereon only once in the course of printing said variable number of entries.

44. In apparatus of the class described in which a printing wheel is rotated to select characters to be printed and is shifted axially to print in different columns on a record medium and provide an entry thereon, the combination of a plurality of settable multi-contact switches and electrical circuits and devices associated therewith for controlling the printing of consecutive numbers in a plurality of said columns, each of said switches being identified with a denominational order of the number, selector switch means for rendering said multi-contact switches effective in sequence, means coordinated with said selector switch means for changing the setting of one or more of said multi-contact switches in the course of printing an entry to cause the next higher consecutive number to be printed as a part of a succeeding entry, said last mentioned means including manually variable control means for causing said change in the setting of said switches to occur only once in the course of printing a variable number of entries so that the same consecutive number will be printed as a part of all of said number of entries, a plurality of indicating registers, means for operating said registers to add a unit to the totals thereon only once in the course of printing said variable number of entries, and means for resetting one of said registers at will.

JOSEPH J. ACKELL.
HERBERT L. PAULDING.

REFERENCES CITED

The following references are of record in the file of this patent:

UNITED STATES PATENTS

| Number | Name | Date |
|---|---|---|
| 448,271 | Silkman | Mar. 17, 1891 |
| 888,808 | Hutches, Jr. | May 26, 1908 |
| 1,826,805 | MacKenzie | Oct. 13, 1931 |
| 2,111,116 | Holzapfel | Mar. 15, 1938 |
| 2,366,913 | LeClair | Jan. 9, 1945 |
| 2,403,006 | Lake et al. | July 2, 1946 |